US008577711B2

(12) United States Patent
Korecki et al.

(10) Patent No.: US 8,577,711 B2
(45) Date of Patent: Nov. 5, 2013

(54) OCCUPANCY ANALYSIS

(75) Inventors: Steven A. Korecki, Grandville, MI (US); Robert L. Beck, Zeeland, MI (US); Gary Gifford, Portage, MI (US); Robin M. Ellerthorpe, Grand Rapids, MI (US)

(73) Assignee: Herman Miller, Inc., Zeeland, MI (US)

( * ) Notice: Subject to any disclaimer, the term of this patent is extended or adjusted under 35 U.S.C. 154(b) by 1534 days.

(21) Appl. No.: 12/011,370

(22) Filed: Jan. 25, 2008

(65) Prior Publication Data
US 2009/0193217 A1    Jul. 30, 2009

(51) Int. Cl.
*G06Q 10/00*    (2012.01)
*G06F 13/00*    (2006.01)

(52) U.S. Cl.
USPC ........................................ 705/7.15; 711/170

(58) Field of Classification Search
USPC ................................................... 705/7–10, 1
See application file for complete search history.

(56) References Cited

U.S. PATENT DOCUMENTS

| 786,081 A | 3/1905 | Witek |
| 2,983,790 A | 5/1961 | Olson |
| 4,052,564 A | 10/1977 | Propst et al. |
| 4,304,386 A | 12/1981 | Nagashima et al. |
| 4,460,217 A | 7/1984 | Tsuda et al. |
| 4,467,252 A | 8/1984 | Takeda et al. |
| 4,470,632 A | 9/1984 | Babbs |
| 4,476,461 A | 10/1984 | Carubia |
| 4,655,505 A | 4/1987 | Kashiwamura et al. |
| 4,658,357 A | 4/1987 | Carroll et al. |
| 4,888,581 A | 12/1989 | Guscott |
| 4,933,618 A | 6/1990 | Ortlieb |
| 4,944,554 A | 7/1990 | Gross et al. |
| 5,015,035 A | 5/1991 | Stoeckl et al. |
| 5,080,318 A | 1/1992 | Takamatsu et al. |
| 5,121,934 A | 6/1992 | Decker et al. |
| 5,181,762 A | 1/1993 | Beumer |
| 5,190,349 A | 3/1993 | Austin, Jr. et al. |
| 5,211,172 A | 5/1993 | McGuane et al. |

(Continued)

FOREIGN PATENT DOCUMENTS

JP    0715827 A  *  6/1995  ............. F24F 11/02

OTHER PUBLICATIONS

Machine translation of JP0715827A.*

(Continued)

*Primary Examiner* — Calvin L Hewitt, II
*Assistant Examiner* — Zeshan Qayyum
(74) *Attorney, Agent, or Firm* — Brinks Hofer Gilson & Lione

(57) ABSTRACT

The disclosed embodiments relate to transparent and/or non-disruptive systems and methods for monitoring and analyzing actual space utilization, and in particular, analyzing space utilization over time and/or in real time to accurately understand and report the utilization of the space. In particular, the disclosed embodiments analyze data representative of occupancy of the space, the data being autonomously determined based on the likelihood that occupants are present within the space. The data is periodically determined and automatically reported to an automated collection system which collects the data and forwards it to a central repository for analysis. The data is then analyzed to provide meaningful reports regarding occupancy of the space or otherwise contextualize the utilization of the space. Further, the data collected from different spaces may be anonymized, aggregated, or otherwise combined, and analyzed to contextualize a given space's utilization, provide utilization forecasts, etc.

24 Claims, 25 Drawing Sheets

(56) References Cited

U.S. PATENT DOCUMENTS

| | | |
|---|---|---|
| 5,214,360 A | 5/1993 | Gonser et al. |
| 5,224,758 A | 7/1993 | Takamatsu et al. |
| 5,232,243 A | 8/1993 | Blackburn |
| 5,266,070 A | 11/1993 | Hagiwara et al. |
| 5,267,778 A | 12/1993 | Krebs et al. |
| 5,272,474 A | 12/1993 | Hilliard |
| 5,281,961 A | 1/1994 | Elwell |
| 5,342,114 A | 8/1994 | Burke et al. |
| 5,384,716 A | 1/1995 | Araki et al. |
| 5,396,443 A | 3/1995 | Mese |
| 5,439,249 A | 8/1995 | Steffens |
| 5,467,002 A | 11/1995 | Brooks |
| 5,484,188 A | 1/1996 | Stoeckl |
| 5,494,311 A | 2/1996 | Blackburn et al. |
| 5,548,764 A | 8/1996 | Duley |
| 5,553,006 A | 9/1996 | Benda |
| 5,556,163 A | 9/1996 | Rogers, III et al. |
| 5,624,132 A | 4/1997 | Blackburn |
| 5,678,886 A | 10/1997 | Infanti |
| 5,732,401 A | 3/1998 | Conway |
| 5,748,473 A | 5/1998 | Breed et al. |
| 5,765,910 A | 6/1998 | Larkin et al. |
| 5,798,945 A | 8/1998 | Benda |
| 5,803,545 A | 9/1998 | Guguin |
| 5,803,547 A | 9/1998 | Brown |
| 5,812,399 A | 9/1998 | Judic et al. |
| 5,844,996 A | 12/1998 | Enzmann et al. |
| 5,884,350 A | 3/1999 | Kurze |
| 5,970,476 A | 10/1999 | Fahey |
| 5,984,349 A | 11/1999 | Van Voorhies |
| 5,986,357 A * | 11/1999 | Myron et al. ............... 307/116 |
| 5,992,931 A | 11/1999 | LaPointe et al. |
| 6,033,021 A | 3/2000 | Udo et al. |
| 6,056,079 A | 5/2000 | Cech et al. |
| 6,068,280 A | 5/2000 | Torres |
| 6,088,642 A | 7/2000 | Finkelstein et al. |
| 6,140,921 A | 10/2000 | Baron et al. |
| 6,147,608 A | 11/2000 | Thacker |
| 6,188,771 B1 | 2/2001 | Horrall |
| 6,282,655 B1 | 8/2001 | Given |
| 6,285,912 B1 | 9/2001 | Ellison et al. |
| 6,289,538 B1 | 9/2001 | Fidge |
| 6,307,475 B1 | 10/2001 | Kelley |
| 6,340,935 B1 | 1/2002 | Hall |
| 6,349,883 B1 | 2/2002 | Simmons et al. |
| 6,356,859 B1 | 3/2002 | Talbot et al. |
| 6,359,564 B1 | 3/2002 | Thacker |
| 6,425,635 B1 | 7/2002 | Pulver |
| 6,487,457 B1 | 11/2002 | Hull et al. |
| 6,492,904 B2 | 12/2002 | Richards |
| 6,496,696 B1 | 12/2002 | Melnik |
| 6,501,391 B1 | 12/2002 | Racunas, Jr. |
| 6,512,455 B2 | 1/2003 | Finn et al. |
| 6,553,336 B1 | 4/2003 | Johnson et al. |
| 6,577,962 B1 | 6/2003 | Afshari |
| 6,642,843 B2 | 11/2003 | Satoh |
| 6,659,562 B2 | 12/2003 | Uchiyama |
| 6,696,948 B2 | 2/2004 | Thompson |
| 6,731,088 B2 | 5/2004 | Nivet |
| 6,752,463 B2 | 6/2004 | Nivet |
| 6,771,173 B1 | 8/2004 | Clayton et al. |
| 6,825,765 B2 | 11/2004 | Stanley |
| 6,831,565 B2 | 12/2004 | Wanami et al. |
| 6,832,987 B2 | 12/2004 | David et al. |
| 6,870,477 B2 | 3/2005 | Gruteser |
| 6,874,855 B2 | 4/2005 | Nivet |
| 6,900,732 B2 | 5/2005 | Richards |
| 6,922,558 B2 | 7/2005 | Delp et al. |
| 6,940,026 B2 | 9/2005 | Rundell |
| 6,964,370 B1 | 11/2005 | Hagale et al. |
| 6,970,080 B1 | 11/2005 | Crouch et al. |
| 6,982,639 B2 | 1/2006 | Brackett et al. |
| 6,989,751 B2 | 1/2006 | Richards |
| 6,991,029 B2 | 1/2006 | Orfield |
| 7,154,399 B2 | 12/2006 | Cuddihy et al. |
| 7,163,263 B1 | 1/2007 | Kurrasch et al. |
| 7,194,539 B2 | 3/2007 | Hughes et al. |
| 7,233,239 B2 | 6/2007 | Chitalia et al. |
| 7,327,268 B2 | 2/2008 | Gruteser |
| 7,330,784 B2 * | 2/2008 | Johnson et al. ............... 701/45 |
| 7,363,643 B2 * | 4/2008 | Drake et al. .................. 725/34 |
| 7,393,053 B2 | 7/2008 | Kurrasch et al. |
| 7,394,345 B1 * | 7/2008 | Ehlinger et al. ............ 340/5.21 |
| 7,482,938 B2 | 1/2009 | Suzuki |
| 7,496,457 B2 | 2/2009 | Fujita et al. |
| 7,523,803 B2 | 4/2009 | Breed |
| 7,554,437 B2 * | 6/2009 | Axelsen ....................... 340/531 |
| 7,735,918 B2 | 6/2010 | Beck |
| 7,768,426 B2 * | 8/2010 | Groft ........................ 340/932.2 |
| 7,898,403 B2 * | 3/2011 | Ritter et al. .................. 340/439 |
| 8,108,055 B2 * | 1/2012 | Wong ............................... 700/1 |
| 2002/0070591 A1 | 6/2002 | Nivet |
| 2002/0070866 A1 * | 6/2002 | Newham .................... 340/573.1 |
| 2003/0025366 A1 | 2/2003 | Barreiro, Jr. |
| 2003/0047983 A1 | 3/2003 | Wanami et al. |
| 2003/0078677 A1 | 4/2003 | Hull et al. |
| 2003/0090376 A1 | 5/2003 | Thompson et al. |
| 2004/0002792 A1 | 1/2004 | Hoffknecht |
| 2004/0111201 A1 | 6/2004 | Thompson et al. |
| 2004/0195876 A1 | 10/2004 | Huiban |
| 2004/0260156 A1 | 12/2004 | David et al. |
| 2005/0092539 A1 | 5/2005 | Chitalia et al. |
| 2005/0093696 A1 | 5/2005 | Gruteser |
| 2005/0121959 A1 | 6/2005 | Kruse et al. |
| 2005/0156457 A1 | 7/2005 | Breed et al. |
| 2005/0192727 A1 | 9/2005 | Shostak |
| 2005/0192915 A1 | 9/2005 | Ahmed et al. |
| 2005/0234600 A1 | 10/2005 | Boucher et al. |
| 2005/0280297 A1 | 12/2005 | Patterson et al. |
| 2006/0006713 A1 | 1/2006 | Patterson et al. |
| 2006/0025897 A1 | 2/2006 | Shostak et al. |
| 2006/0044152 A1 | 3/2006 | Wang |
| 2006/0176158 A1 | 8/2006 | Fleming |
| 2006/0184325 A1 | 8/2006 | Orfield |
| 2006/0215345 A1 | 9/2006 | Huizenga |
| 2006/0219459 A1 | 10/2006 | Suzuki |
| 2007/0024708 A1 | 2/2007 | Lin et al. |
| 2007/0055760 A1 | 3/2007 | McCoy et al. |
| 2007/0061050 A1 | 3/2007 | Hoffknecht |
| 2007/0083294 A1 * | 4/2007 | Bruno ........................... 700/295 |
| 2007/0097993 A1 | 5/2007 | Bojahra et al. |
| 2007/0108809 A1 | 5/2007 | Kurrasch et al. |
| 2007/0136110 A1 * | 6/2007 | Presley et al. ................... 705/5 |
| 2007/0182535 A1 | 8/2007 | Seguchi |
| 2007/0194900 A1 | 8/2007 | Hawkins |
| 2007/0205884 A1 | 9/2007 | Federspiel |
| 2008/0036252 A1 | 2/2008 | Breed |
| 2008/0084290 A1 | 4/2008 | Hawkins |
| 2008/0094213 A1 | 4/2008 | Morgan |
| 2008/0109289 A1 * | 5/2008 | Vivadelli et al. .................. 705/7 |
| 2008/0129482 A1 | 6/2008 | Seguchi |
| 2008/0195261 A1 * | 8/2008 | Breed ............................... 701/2 |
| 2008/0204227 A1 | 8/2008 | Gruteser |
| 2008/0211684 A1 | 9/2008 | Beck |
| 2009/0040055 A1 | 2/2009 | Hattori |
| 2009/0121854 A1 | 5/2009 | Raisanen |
| 2009/0285413 A1 * | 11/2009 | Roesch ........................ 381/104 |

OTHER PUBLICATIONS

Smith et al. "RFID-Based Techniques for Human-Activity Detection", Communications of the ACM, Sep. 2005/vol. 48. No. 9, pp. 39-44.

Ashraf, "Domain Specific Modelling Project", NWTM Care in the community, D5.1 Issue 1, Published in Scotland, Jan. 12, 2004, 28 pages.

"Smart Space", Ubisense, www.ubisense.net, 4 pgs.

(56) References Cited

OTHER PUBLICATIONS

"QuietCare", obtained from http://www.quietcaresystems.com/index_fl.htm, © 2004 Living Independently Group, Inc., Jan. 22, 2008, 7 pgs.

"Point Six Wireless"—Lexington, KY—http://www.pointsix.com, 29 pages.

Energy Notes, vol. 4, Issue 2, Dec. 2006, "Wireless Smart Lighting System", University of California Energy Institute, Berkeley, CA., 6 pgs.

Jao-Jung Wen, "Smart Dust Sensor Mote Characterization, Validation, Fusion and Actuation", report of completion of Masters of Science, Plan II, Semester 2004, 66 pgs.

Sensor node—Wikipedia, the free encyclopedia, obtained at http://en.wikipedia.org/siki/Sensor_node, Sep. 21, 2007, 8 pgs.

MEMS 'Smart Dust Motes' for Designing, Monitoring & Enabling Efficient Lighting, Micro Project Industry Sponsor General Electric Company; Global Reesearch Center, Nov. 3, 2003, 97 pgs.

Accelerometer—Wikipedia, the free encyclopedia, obtained at http://en.wikipedia.orq/wiki/Accelerometer, Oct. 11, 2007, 13 pgs.

Shinya Saeki, Nikkei Electronics, "Hitachi's Sensor Depicts Human Relationships as Topographic Map", obtained at http://techon.nikkeibp.co.jp/english/NEWS_EN/20070625/134708/?ST=english_PRINT, Jun. 26, 2007, 2 pgs.

Saeki, S.; Nikkei Electronics; "Hitachi's Sensor Depicts Human Relationships as Topographical Map";Nikkei Business Publications, Inc.; http://techon.nikkeibp.co.jp/english/NEWS_EN/20070625/134708/?ST=english_PRINT; accessed from the Internet Jun. 26, 2007; two pages.

\* cited by examiner

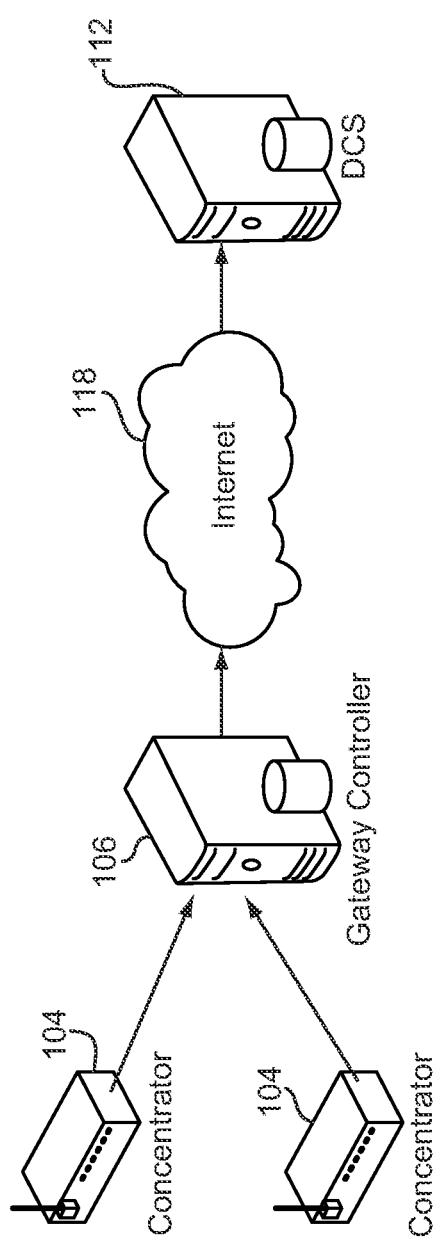
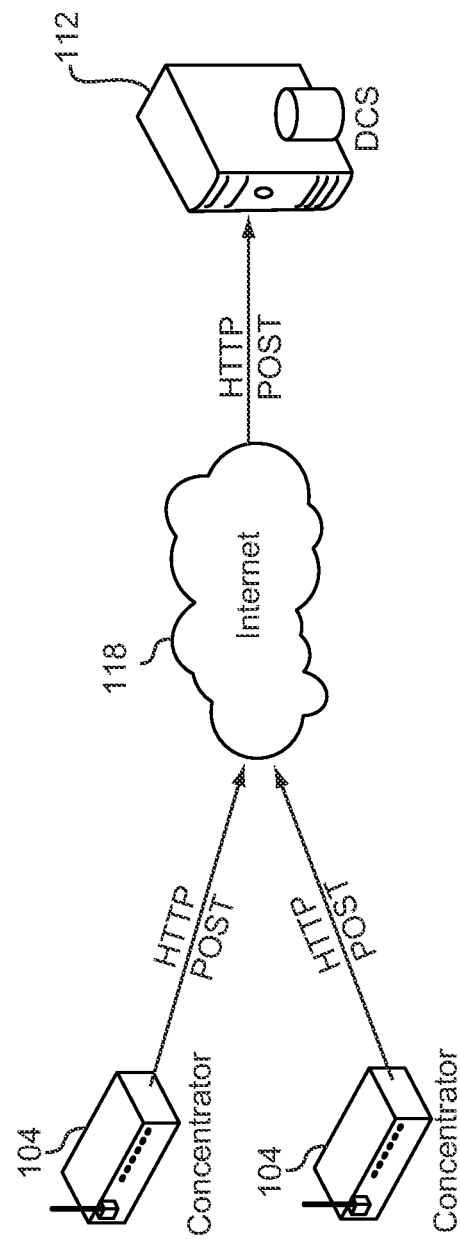

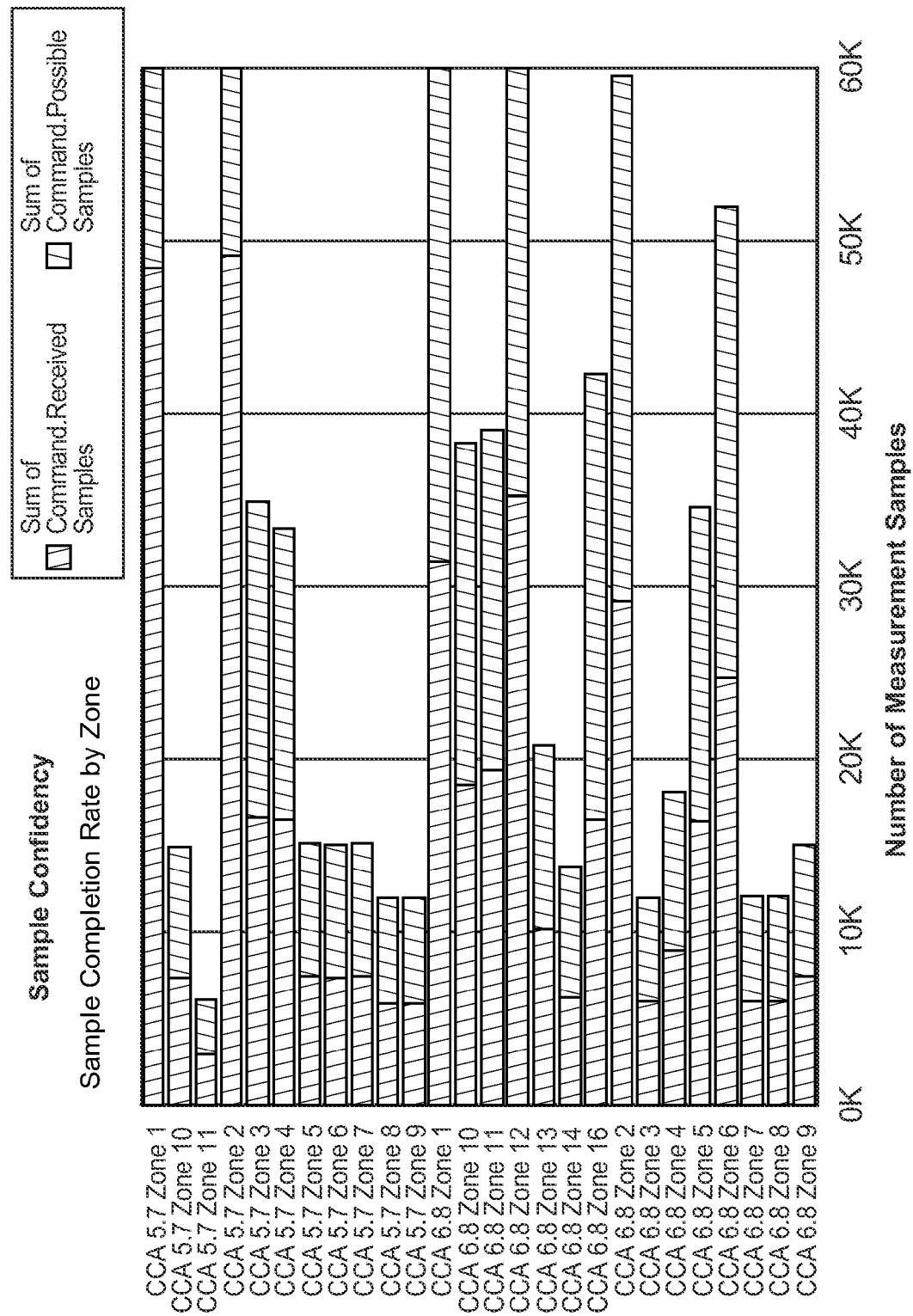

OCCUPANCY ANALYSIS

BACKGROUND

Most companies require physical space for their operations, such as to house their employees, manufacturing operations and/or inventory. The costs of acquiring and maintaining space can be significant, especially for large or disperse organizations with a large work force. Further, those needs may be dynamic, changing based on business cycles, economic or environmental factors, etc. Accordingly, it is important that space be utilized efficiently to realize both direct and indirect savings, such as lower real estate costs, utility costs, taxes, etc. For example, a company which owns two buildings capable of housing 1000 employees each may be incurring unnecessary costs if each building is actually only be utilized by 500 employees at any given time. In this case, it may make sense for the company to consolidate to one building or downsize to eliminate excess capacity, and thereby lower costs.

Unfortunately, space utilization is dynamic and varies over time making the measurement of utilization difficult. Work schedules, business cycles, productions schedules, holidays and other extraneous events all combine to cause fluctuations in utilization. Therefore, to understand utilization of a space, once needs to monitor, measure and analyze utilization over time.

BRIEF DESCRIPTION OF THE DRAWINGS

FIG. 3A shows a typical deployment of a configuration utilizing a Gateway Controller for use with the disclosed embodiments.

FIG. 3B depicts shows a typical deployment configuration utilizing hosted Gateway Controller functionality for use with the disclosed embodiments.

DETAILED DESCRIPTION OF THE DRAWINGS AND PRESENTLY PREFERRED EMBODIMENTS

Figure 1:
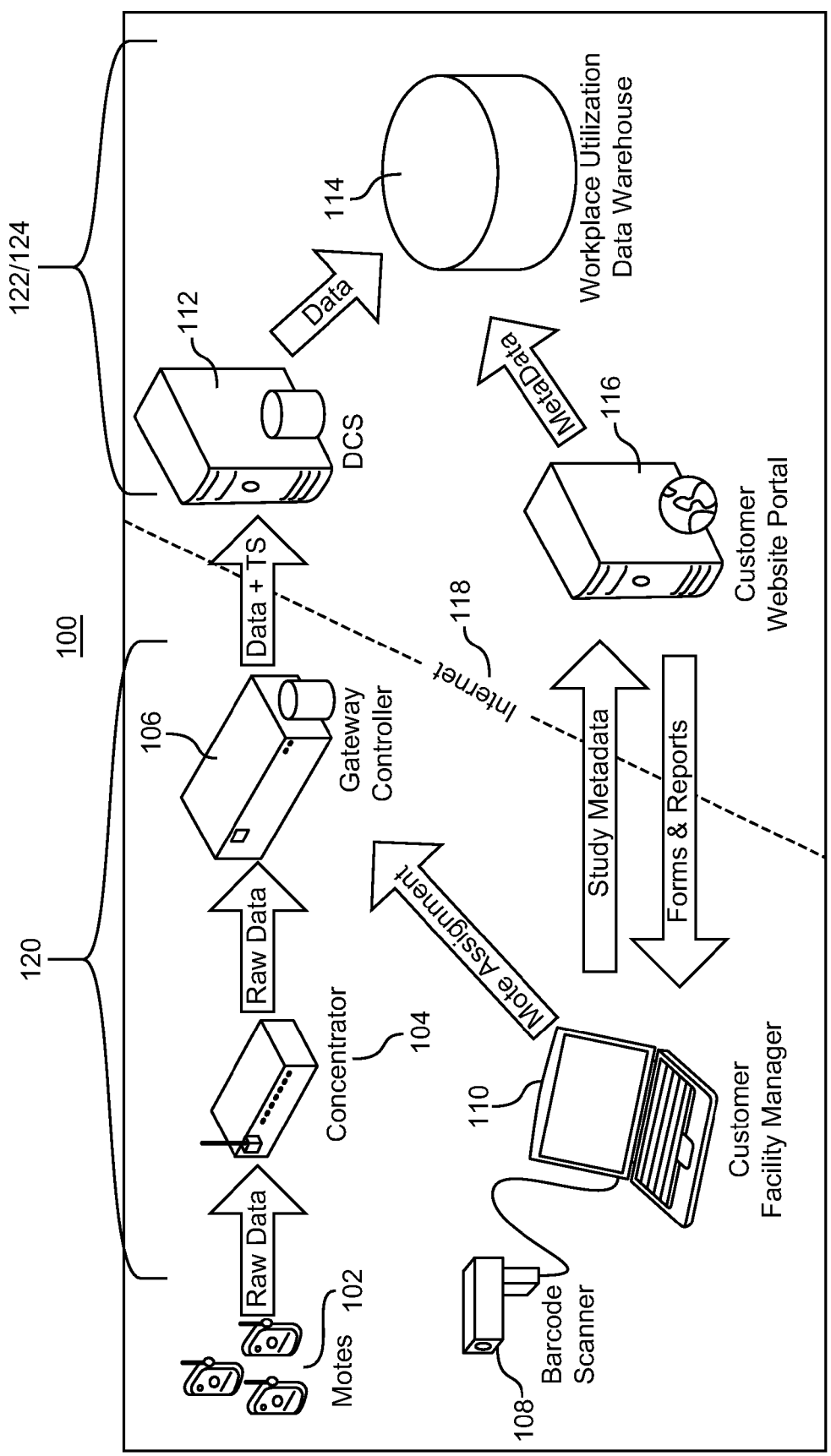
FIG. 1 shows a block diagram depicting data flow in an exemplary utilization monitoring and analyzing system.

The disclosed embodiments relate to transparent and/or non-disruptive systems and methods for monitoring and analyzing actual space utilization, and in particular, analyzing space utilization over time and/or in real time to accurately understand and report the utilization of the space. In particular, the disclosed embodiments analyze data representative of occupancy of the space, the data being autonomously determined based on the likelihood that occupants are present within the space. The data is periodically determined and automatically reported to an automated collection system which collects the data and forwards it to a central repository for analysis. The data is then analyzed to provide meaningful reports regarding occupancy of the space or otherwise contextualize the utilization of the space. Further, the data collected from different spaces may be anonymized, aggregated, or otherwise combined, and analyzed to contextualize a given space's utilization, provide utilization forecasts, etc.

Thereby, the costs associated with space provisioning may be substantially monitored and controlled to meet changing demands, reduce costs and increase productivity. In particular, the analysis and reports may be used to re-design or re-allocate space, assess real estate holdings, identify space designs which hinder or promote productivity, develop usage profiles of spaces and/or the workers which use them, or combinations thereof.

In one embodiment, a turnkey workplace utilization analysis service for customers of a vendor, such as a vendor of workplace furniture, is provided. An exemplary vendor is Herman Miller, Inc. located in Holland, Mich., also referred to herein as "HMI." As will be described, workplace utilization may be determined by monitoring human activity at a furniture level using wireless occupancy sensors. The data is collected and transmitted back to the vendor for detailed analysis and visualization. Analysts, for example as part of a Workplace Professional Services team, then process, analyze or otherwise compile the results into a formal report which is delivered to the customer.

In an alternate embodiment, a master data warehouse that compares the workplace utilization data from all studies may also be created. This normative database will provide a vendor or other provider with an improved level of empirical data on how space is utilized. As the number of studies increases, this comparative data will feed back to customers so that they may see, for example, how their workplace utilization compares within their company, such as between different buildings or geographic locations, and/or to other companies in, or outside of, their industry, demographic, and/or geographic segments. In one embodiment an index value, described in more detail below, may be generated which is a normalized indicator of utilization as compared to a define scale. This index value may be computed across physical spaces of one or more companies, across companies, industries, demographic and/or geographic boundaries.

In general, the process of analyzing utilization includes gathering information regarding the space to be analyzed, installing monitoring equipment, performing the monitoring of the occupancy of the space and, optionally, removing the installed equipment at the conclusion of the process. Once the data is accumulated, analysis is performed as will be described.

Prior to monitoring utilization, sensors and associated communications devices may need to be installed within the space to be monitored, as will be described. In one embodiment, deploying occupancy sensing sensors into a facility may utilize bar code scanners. Wireless sensor nodes are also referred to as "motes." In one embodiment, the occupancy sensors include motes but may also include other types of sensing devices. Before a study begins, a customer provides a complete list of spaces which are to be monitored for a study, which may include a floor plan and a determination of the number physical elements to be monitored. These spaces are then loaded into a database where they can be uniquely identified. Furthermore, a serial number for each mote is uniquely identified in the database and logically attached to the device in the form of a bar code label. Other types of identification methods may also be used, such as RFID tags, which would allow remote detection, identification and/or location of the subject mote without having to visually identify it. During the deployment phase of a study, a mote is assigned to a space using a bar code scanner and a user interface running, for example, on the gateway server, hand held scanner, a PC, etc. It is possible to assign multiple motes to a single space, or to move a mote from space to space during a study.

There may be two primary processes used to assign motes to spaces during a deployment. In one case, each space is uniquely identified down to an individual physical element (chair) level. This provides the most granular data for reporting. In the second case, an ambiguity is introduced by assigning a mote to a group. In this situation, it is not possible to report or correlate data to an individual space or person, but it does insert a greater degree of personal privacy.

If a customer chooses to install the workplace utilization system themselves, all equipment for a study may be packaged and sent to them. It may contain detailed installation instructions which could be available in printed form and/or online through the customer website portal. Upon receipt of the equipment, the customer may begin deploying the equipment. Devices may be placed in the following order: 1. Gateway Controller, if necessary, which can be placed anywhere in a facility, but typically requires power and LAN lines though self, e.g. battery, powered and/or wireless devices may also be used. If required, there is typically one gateway controller for a given deployment; 2. Concentrators (also called receivers) of which there are typically one for approximately every 30 motes, but may depend on proximity and RF obstructions. A typical concentrator may be capable of receiving data from any mote within an approximate 150 foot radius or more depending on line of site or other environmental conditions. These devices typically require power and LAN lines, though self-powered and/or wireless technologies may also be used, and must be placed through out a facility to provide adequate coverage to all motes; and 3. In an alternate embodiment, mesh, i.e. ad hoc, networking may be utilized where each mote establishes itself as a network node capable of retransmitting the communications of other motes, etc., thereby obviating the need for point to point communications with a centralized receiver. Motes which are to be attached to furniture pieces, such as chairs or work surfaces, using a selected attachment method, such as Velcro or other mode of attachment which provides adequate security and stability in a full deployment. As motes are deployed, they must be assigned to a location within the system. This could be done, for example, through the customer website program or the gateway controller, etc.

In one embodiment, the gateway controller, if utilized, may provide a user interface that allows installers to assign a mote to a physical location and verify connectivity of all motes.

Once all equipment has been successfully installed and validated, data will be collected and transmitted to the vendor for monitoring and analysis. There is little to no activity by a customer during this phase, aside from basic maintenance. If a vendor-analyst identifies an area where data is missing or appears invalid, a customer may be asked to replace or reposition the mote. The data will be used to develop analysis reports for the customer either on an on-going basis or at the conclusion of a defined study. These reports should be delivered through a customer website portal.

At the conclusion of the monitoring phase, for example after approximately 3 weeks, all equipment may be collected, repackaged, and returned. Alternatively, the equipment may be maintained in place for continuous monitoring and reporting.

The minimum amount of hardware required for deployment may include an array of workplace utilization sensing motes dependent upon the number of physical elements to be monitored, an appropriate number of concentrators/receivers, for example approximately one for approximately every 30 motes, and an optional gateway controller, as will be described. In one embodiment, Local Area Network (LAN)-attached concentrators/receivers at the Room-tier aggregate the data from the wireless sensor motes. IP address for each concentrator may be provided by the customer or operator of the LAN prior to installation so that they may be pre-configured for deployment. Alternatively, Dynamic Host Control Protocol (DHCP) may be used. Alternatively, ad hoc or mesh networks may be used in conjunction with a wireless, such as cellular based, data collection node to convey mote data to the back end system for analysis, as described above. It will be appreciated that there are many different ways, depending upon the implementation, to gather the data from the occupancy sensors and covey that data to the backend systems for analysis.

Figure 7A:
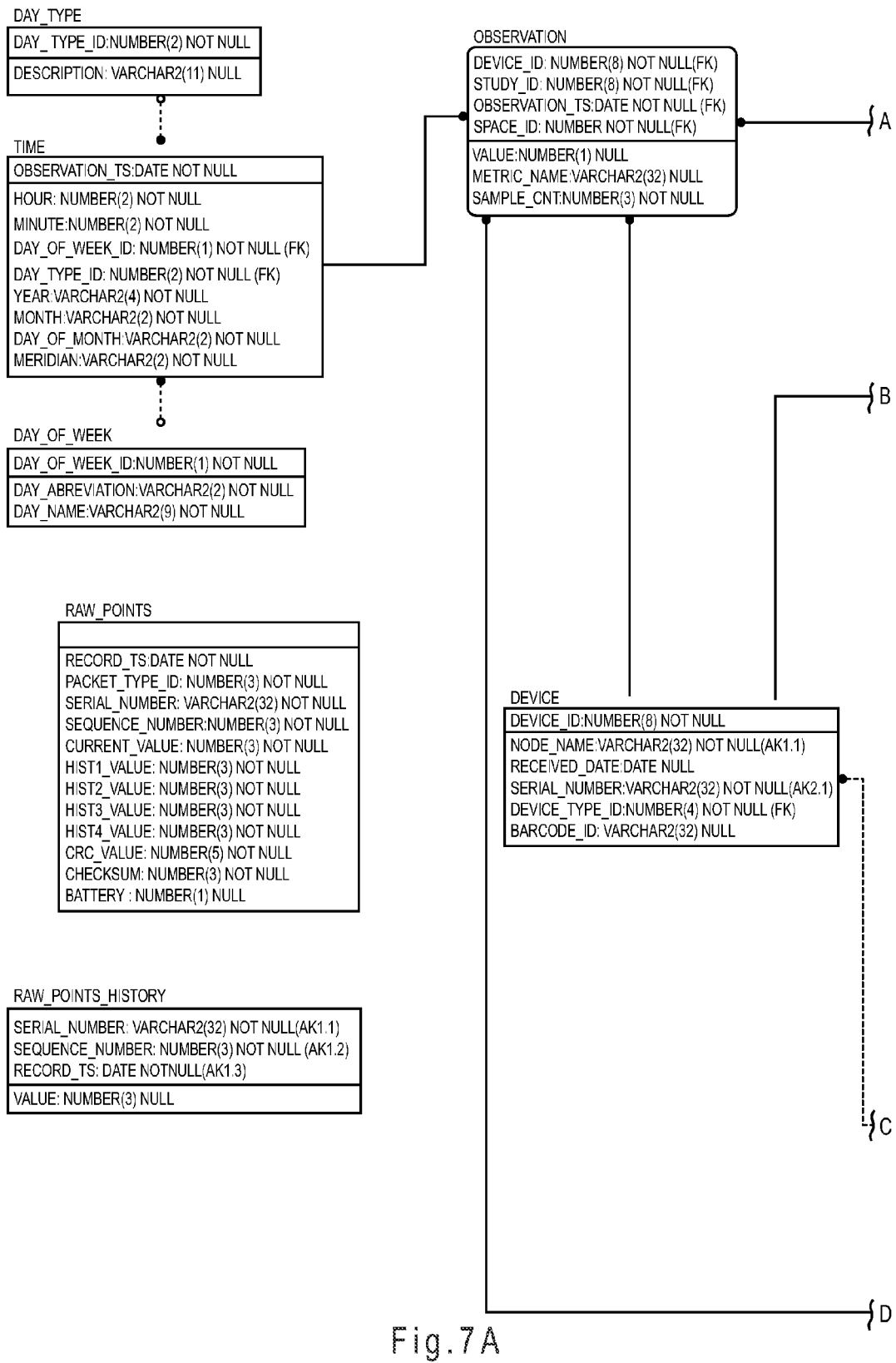
FIGS. 7A and 7B depict an exemplary database schema for use with the disclosed embodiments.
Figure 7B:
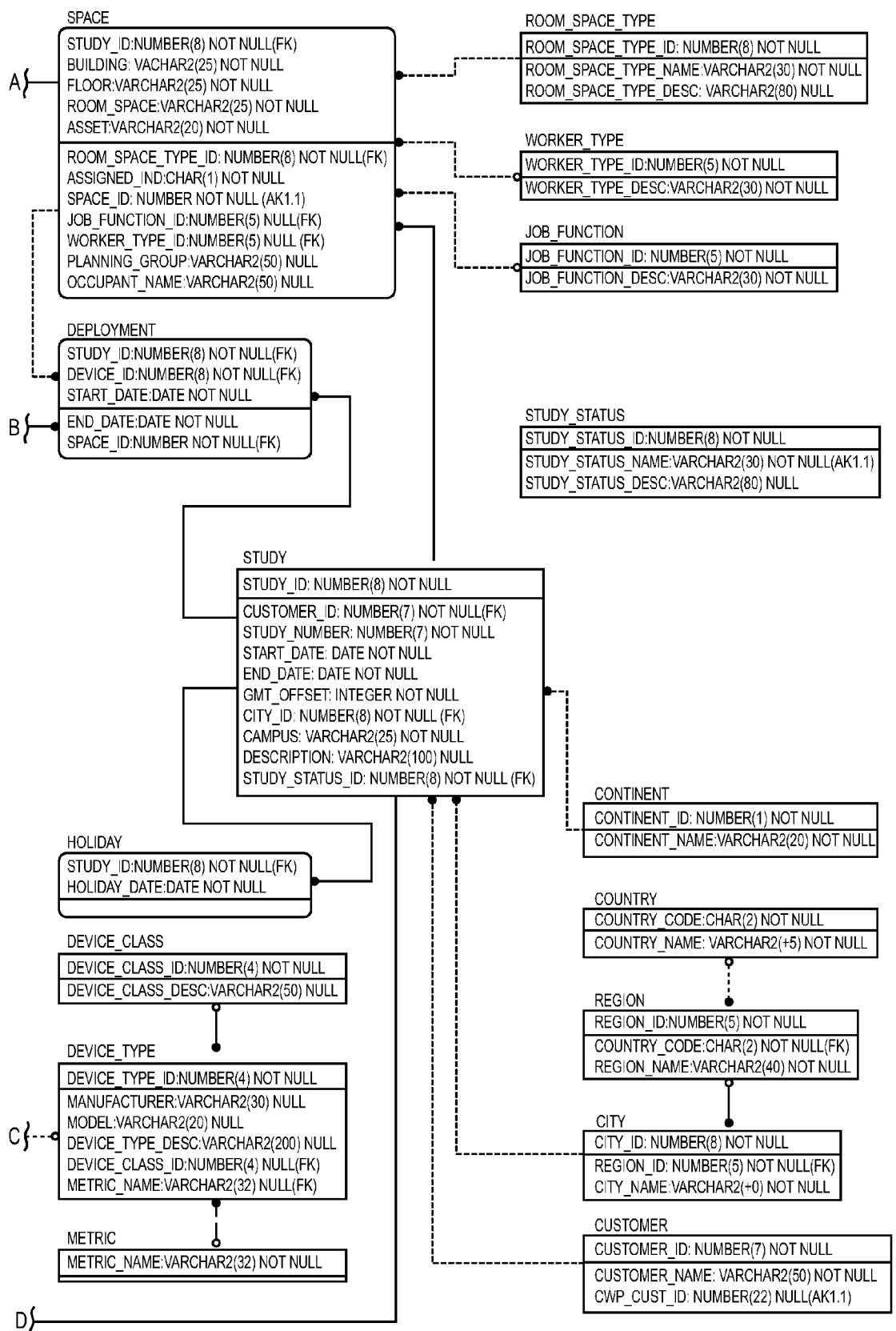

To be able to contextualize utilization data, the data, and therefore the sensor/mote should be logically associated with the physical element to which the mote is physically attached. The logical association is maintained at the back-end of the system and utilized to determine and understand the physical locations from which the data is generated. There are many ways that this could be done. In one embodiment, motes could be pre-assigned to a location or assigned at the time of deployment. As described herein, the metadata that describes the uniquely addressed spaces in a facility will be provided by a customer in advance of an installation. This data may be entered into a space utilization database schema to uniquely identify every physical location that is to be monitored. An exemplary Schema is shown in FIGS. 7A and 7B. In one embodiment, an installer may have a handheld device that could be used to dynamically associate the mote with an identified space. This would be beneficial for initial installation as well as in the event of a mote being relocated during a study. For example, a USB barcode scanner may be utilized which can be plugged into any PC with a USB port and be treated like a keyboard without installing any software. This makes it possible to scan motes into a web-based form to associate them to a particular location or asset. Other embodiments may include more sophisticated handheld barcode scanners or RFID readers that may run an interface to dynamically assign motes to spaces, such as by using GPS or other location based technology. Furthermore, motes may be dynamically located using their wireless signal or an attached RFID tag.

The data collected by the wireless sensor network on the LAN connected concentrators may be transmitted to a Data Collection Server (DCS). In large scale implementations, such as implementations with 100 or more motes, the concentrators may communicate with the DCS via an optional Gateway Controller. FIG. 3A, described in more detail below, shows a typical deployment of a configuration utilizing a Gateway Controller.

For smaller deployments, the services typically provided by a Gateway Controller may be hosted on a DCS located at a vendor operated facility. This would minimize the equipment required at customer facilities. FIG. 3B, described in more detail below, shows a typical deployment configuration utilizing hosted Gateway Controller functionality.

In implementations utilizing a gateway controller, the controller should be flexible enough to receive data in various formats to allow for technology changes at the mote and concentrator levels. Each technology may have a unique method of transmitting data to a Gateway Controller, such as utilizing HTTP POST operations to send XML data to a Web Service, utilizing socket communication to send hexadecimal messages to the gateway controller, or other methods.

Data transmitted to the gateway controller may be stored in a local embedded database for temporary storage and visualization, such as a standard relational database which may be utilized for flexibility and performance. The gateway controller may forward data continuously to the DCS or communicate in batch, on a scheduled interval, to transmit data back to the DCS where it can be loaded into the Workplace Utilization Study Database (WUSD). In one embodiment, File Transfer Protocol (FTP) is utilized to communicate data from the gateway controller to the DCS.

Some customers may have more strict security standards and will require specific means of communication between a gateway controller and the DCS. The standard use of FTP is unencrypted which may be desirable to a customer because they can use their standard network security tools to monitor all data transmission. However, other customers may prefer to have that data encrypted which may be done with SFTP or a web service. It is also possible to consider ways for the Gateway Controller to transmit the data to a customer owned and operated server as an intermediate step. This would allow the Gateway Controller to operate on an internal network with no access to the Internet. The customer would then be responsible for transmitting the data back to the DCS.

Aside from data transmission, there is also a need to secure the operating system of the gateway controller. Only required services should be operational and the machine should be "hardened" as though it was to be placed in a DMZ.

It is Herman Miller's intention to build an architecture that can support the growing demand for space utilization analysis services. It is estimated an individual study may require somewhere between 100 and 1000 or more wireless sensing motes and may depend on whether the installation is temporary or for the purpose of on-going analysis. The architecture should be able to support multiple concurrent studies and be designed for easy growth as demand increases. Considering this, a light-weight scalable architecture is preferred. Ideally, a Gateway Controller would be capable of supporting multiple concurrent studies. Additionally, multiple DCS servers should be able to work in parallel. This would allow for a load balanced farm configuration to fluidly expand and contract to meet market demand.

An exemplary database schema for in a workspace utilization database is shown in FIGS. 7A and 7B for the analysis of workplace utilization analysis studies. This schema accommodates several dimensions of metadata that are associated with the observed sensor data. It offers a flexible design that is independent of individual sensor and delivery technologies. It is intended to provide rich drill down reporting and analysis.

In one embodiment, as the number of studies grows over time, they may be stripped of any content that explicitly identify a customer and then migrated into a master comparative data warehouse known as the "Workplace Utilization Data Warehouse" (WUDW). This master data warehouse aggregates normalized data from all workplace utilization studies. This will enable broad comparisons and aggregations across customers, industries, geographic locations and more.

In one embodiment, the user interface to the workplace utilization system may be a basic CRUD (create, read, update, delete) system that includes data visualization. Alternatively, the user interface may be a full application containing business logic and workflows. User interfaces should be made available for both the Workplace Utilization Study Database and the Workplace Utilization Data Warehouse. The user interface may utilize SQL or other database access protocol.

Figure 5:
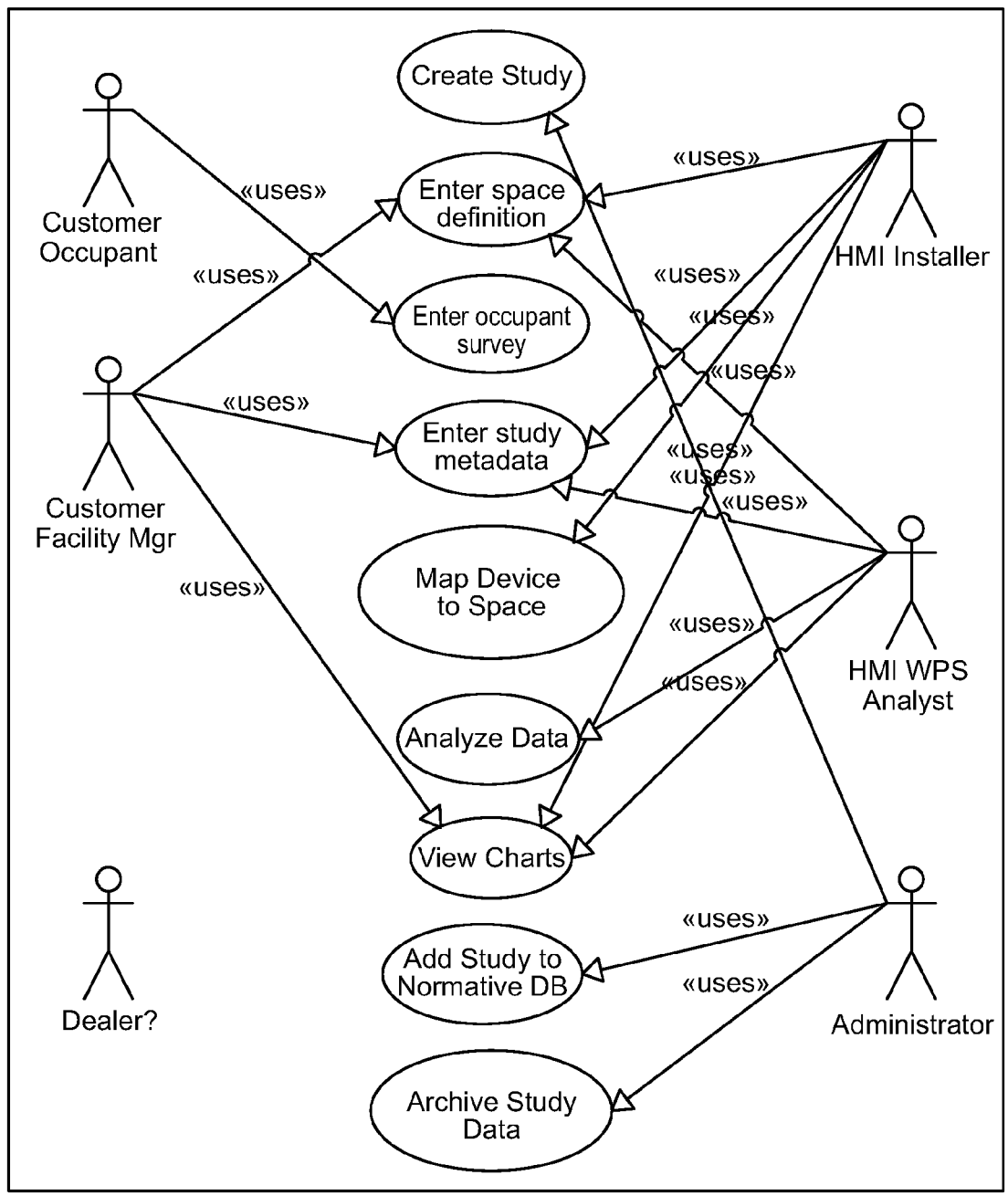
FIG. 5 shows a general use case diagram for use with the disclosed embodiments.

High-level Use Cases may be developed to help describe the intended functionality of the data management and analysis interfaces to the WUSD and WUDW. FIG. 5 shows a general use case diagram for use with the disclosed embodiments. Exemplary use cases for use with the disclosed embodiments are shown in Tables A-E below.

TABLE A

| High-Level Use Case 1: Creating Study | |
|---|---|
| Use Case Name: | Create Study |
| Use Case ID: | HLUC1 |
| Version: | original |
| Initiating Actor(s): | Administrator |
| Description: | Create a new instance of a study inside the WUSD and populate it with all study related information. This would be the first step taken to initiate a new study. In alternative embodiments, a new schema may be created for each study, such as by making a copy of a template schema or database. |
| Pre-conditions: | Actor has logged into the system and been authenticated with appropriate permissions to perform this task. |
| Event Sequence: | Actor | System |

| | Actor | System |
|---|---|---|
| | | 1. Present Admin Welcome Screen |
| | 2. Select administrative task to "Create a new study" | 3. Prompt actor for new or existing workplace utilization customer name. |
| | 4a. Select "new customer". | 5a. Prompt actor to search list of existing Herman Miller customers |
| | 6. Enter search string for customer company name. | 7. Present results of search. |
| | 8. Select appropriate customer from search results. | 9. Prompt actor for all "study" data as described in the OSD Study table. |
| | 10. Enter field values. | |
| | 11. Select "Create". | 12. Create a new study in the WUSD schema and populate it with specified study data. |

TABLE A-continued

High-Level Use Case 1: Creating Study

|  |  |  |
|---|---|---|
|  |  | 13. Present confirmation that the schema has been created. |
|  |  | 14. Present editable interface to new WUSD schema, including option to upload a graphical floor plan. |
| Alternate Sequences: | 4b. Select "existing customer". | 5b. Prompt actor to search or browse list of current workplace utilization customers. |
| Post-conditions: | New study data exists in new or existing OSD schema. | |
| External Server Actor(s): | TBD | |
| External Receiver Server Actor(s): | WUSD Database Server | |
| Source of Use Case: | Mar. 30, 2007 - SAK - Created initial version of Use Case from scratch. | |

TABLE B

High-level Use Case 2: Enter Space Definition

| | | |
|---|---|---|
| Use Case Name: | Enter Space Definition | |
| Use Case ID: | HLUC2 | |
| Version: | original | |
| Initiating Actor(s): | Customer Facility Mgr, HMI Installer, HMI WPS Analyst, or Administrator | |
| Description: | Enter all descriptive data to uniquely identify every location that is to be monitored during an workplace utilization study. | |
| Pre-conditions: | Actor has logged into the system and been authenticated with appropriate permissions to perform this task. A WUSD schema exists and has been populated with all required information about the current study. A listing of all unique spaces has been provided, in the case of a third party entering the data. | |
| Event Sequence: | Actor | System |
|  |  | 1. Present Admin Welcome Screen |
|  | 2. Select "Manage existing study". | 3. Present sort-able list of studies by date. |
|  | 3. Select desired study. | 4. Present study management screen populated with the specified study. |
|  | 5. Select task to "Create new space definition" | 6. Prompt for Country, State, County, City, Campus, Building, and Location, Room. |
|  | 7. Enter values and select "submit". | 8. Build hierarchical model of newly defined space and present it, where a hierarchy is enforced. |
|  | 9. Select option to "Add new sub-location(s)" | 10. Prompt for new sub-location name or list of names. |
|  | 11. Enter sub-location name or names and submit, | 12. Store fully qualified sub-location in WUSD. |
|  |  | 13. Present study management screen for current study. |
| Alternate Sequences: | | |
| Post-conditions: | New space definition(s) exist in the current WUSD schema. | |
| External Server Actor(s): | TBD | |
| External Receiver Server Actor(s): | WUSD Database Server | |
| Source of Use Case: | Mar. 30, 2007 - SAK - Created initial version of Use Case from scratch. | |

TABLE C

High-level Use Case 3: Enter Occupant Survey

| | |
|---|---|
| Use Case Name: | Enter Occupant Survey |
| Use Case ID: | HLUC3 |
| Version: | original |
| Initiating Actor(s): | Customer Occupant |
| Description: | Collect profile information from an occupant at a customer facility being studied. The intent is to get as much information as possible that could be used to better understand the type of worker and the type of space being studied. |
| Pre-conditions: | A WUSD schema exists and has been populated with all required information about the current study. All space definitions have been entered into the WUSD. An HMI Analyst has sent an email containing a link to the occupant survey. Email may be sent to all occupants directly or to the point of contact for the customer facility. |

| Event Sequence: | Actor | System |
|---|---|---|
| | 1. Select URL link in email. URL should contain an identifier for the current study. | 2. Present Survey Welcome Screen for the current study. |
| | | 3. Check if user has already submitted a survey. |
| | | 4a. Prompt the user to select any location that is assigned to them. |
| | 4. Select primary office location. | 5. Present an editable form of survey questions. |
| | 6. Enter values into survey form. | 7. Store values in WUSD. |
| Alternate Sequences: | | 4b. Notify occupant that their survey has already been received. |

| | |
|---|---|
| Post-conditions: | Occupant survey results have been stored in database and associated to their assigned space. |
| External Server Actor(s): | TBD |
| External Receiver Server Actor(s): | WUSD Database Server |
| Source of Use Case: | Apr. 04, 2007 - SAK - Created initial version of Use Case from scratch. |

TABLE D

High-level Use Case 4: Enter Study Metadata

| | |
|---|---|
| Use Case Name: | Enter Study Metadata |
| Use Case ID: | HLUC4 |
| Version: | original |
| Initiating Actor(s): | HMI WPS Analyst, or Administrator or, alternatively, Customer Facility Mgr or HMI Installer, |
| Description: | Enter customer specific study data including shifts, day types (holiday, etc . . . ), data to uniquely identify the business organization levels |
| Pre-conditions: | Actor has logged into the system and been authenticated with appropriate permissions to perform this task. An OSD schema exists and has been populated with all required information about the current study. |

| Event Sequence: | Actor | System |
|---|---|---|
| | | 1. Present Admin Welcome Screen |
| | 2. Select "Manage existing study". | 3. Present sort-able list of studies by date. |
| | 3. Select desired study. | 4. Present study management screen populated with the specified study. |
| | 5. Select task to "Enter Customer/Study Specific Study Data? | 6. Present editable interface for WUSD meta data tables. |
| | 7. Enter values and select "submit". | 8a. Validate values. |

TABLE D-continued

High-level Use Case 4: Enter Study Metadata

| | |
|---|---|
| | 9. Store values in WUSD |
| | 10. Present study management screen for current study. |
| Alternate Sequences: | 8b. Prompt user to enter valid data in specified field(s). |
| Post-conditions: | New study metadata exist in the current WUSD schema. |
| External Server Actor(s): | TBD |
| External Receiver Server Actor(s): | WUSD Database Server |
| Source of Use Case: | Apr. 05, 2007 - SAK - Created initial version of Use Case from scratch. |

TABLE E

High-level Use Case 5: Map Device to Space

| | |
|---|---|
| Use Case Name: | Enter Study Metadata |
| Use Case ID: | HLUC4 |
| Version: | original |
| Initiating Actor(s): | Installer (HMI, Dealer or Customer) |
| Description: | Assign the device ID for a physical sensor to a unique space defined in the OSD. This could be done through a web-based tool or perhaps a hand-held device at the customer location at the time of installation. Barcodes could possibly be used. |
| Pre-conditions: | TBD |
| Event Sequence: | TBD |
| Alternate Sequences: | |
| Post-conditions: | |
| External Server Actor(s): | TBD |
| External Receiver Server Actor(s): | Database Server |
| Source of Use Case: | Mar. 30, 2007 - SAK - Created initial version of Use Case from scratch. |

Other exemplary use cases may include a use case for moving a device, analyzing data, viewing a chart, adding a study to the WUDW, archiving study data, etc.

The disclosed embodiments further contemplate the development of meaningful workplace utilization reports to contextualize and communicate analyses of space utilization to customers, such as real estate strategists, facility management teams, and vendors such as Herman Miller Workplace Strategies Teams, to analyze space utilization at a customer facility.

A reporting system is provided that allows workplace analysts to dynamically visualize the space utilization data gathered by the wireless workplace utilization sensing systems. Exemplary reports include:
Average Building Utilization by Day of Week
Average Building Utilization by Date
Average Utilization by Space Type
Comparative Average Utilization by Space
Observation Sample Volume (diagnostic)
Average Utilization of Individual Spaces
Detailed Individual Usage
Detailed Individual Usage with Sample Count (diagnostic)
Additional reports can be created to meet customer needs such as reports based on business organization, job function, furniture configuration, etc.

FIGS. 8N-8U depict exemplary charts showing various ways occupancy and utilization may be contextualized to derive an understanding of the utilization of a given space.

In one exemplary implementation, the disclosed system may utilize the following technologies and standards (shown in FIGS. 1, 2, & 4), individually or in combination, however, it will be appreciated that other technologies or standards may be utilized in lieu of or in combination with the technologies below, and are implementation dependent.

Furniture Tier
"Mote"—Motion sensors manufactured by PointSix Corporation and operating in accordance with the disclosed embodiments.

Room Tier
"Concentrator/Receiver"—PointSix PointManagers or Point Repeaters or a customized device which couples the receiving functionality of a PointManager with a single-board computer such as a Soekris Net5501 for added flexibility and robustness.

Campus Tier
"Gateway"—Soekris Net5501 single-board computer

HMI Analysis Tier
"DCS"—Sun Fire V880 server running the Solaris operating system, Perl, Oracle database client software.
"Database Server"—HP RX8620 server running the HP-UX operating system, Oracle Enterprise Server database software
"Customer Website Portal"—Sun Fire V880 server running the Solaris operating system, SunOne Directory, SunOne Web Server, Websphere Application Server, Vignette Content Management & Portal, IBM Websphere Portlet Factory, Java, Oracle database client.

"WPS Analyst PC"—Dell Latitude D830 running Windows XP, Business Objects Desktop Intelligence, Crystal Reports XI, MS Office, Adobe Acrobat, Java, Installation Toolkit "Laptop"—Dell Latitude D830 running Windows XP "Barcode Scanner"—IDAutomation USB Barcode Scanner The disclosed embodiments provide a system for deriving an understanding of the use of space and use of real estate in both real time, historically, as well as projected utilization, e.g. forecasting. Is a space underutilized? Does a certain layout or arrangement work better than other space designs? Do people have a preference of one space over another? How many of my workers are truly mobile? Can I reduce the number of offices? Can I reduce my real estate holdings? Can the availability of space be determined and scheduled based on near real time occupancy readings. The disclosed embodiments provide 24 hour 7 day monitoring of seats, or other physical elements typically utilized by a single occupant, and consequently space and can provide high quality, accurate data about the present and historical use of space. This is in contrast to other occupancy detection systems which merely detect real time events, such as to turn lights on or off as a person comes and goes.

The disclosed embodiments further relate to space management based on deriving understandings of the use of a space. For example, many workers are mobile and do not need a full time office. Accordingly. a company may reduce its number of offices by moving to a free address system (hotelling), since in many cases, a large number of people are never physically present. The disclosed embodiments may provide a near real time status of occupied and unoccupied offices, or other spaces, and, for example, can provide data as input to a graphic locator and/or scheduling system. Moreover, the collected occupancy data may be combined with data from other sensors, such as temperature sensors (or other environmental sensors), to provide for preferential space selection, such as a preference of warm or cool space, or other parameters.

The disclosed embodiments may further relate to a business model which includes, for example, a service team that installs occupancy sensors, such as to the bottom of a customer's chairs on an on-going or temporal basis, associated supporting equipment as will be described below, and provides simple to sophisticated reports about the use of the monitored space. Additionally, the sensors can be left in place, e.g. on the chair, to provide long term monitoring of space and environmental conditions, providing input to environmental control systems and to interface with space scheduling systems.

The disclosed embodiments may further permit the growth/accumulation of a knowledge base, e.g. a data warehouse, of understanding about how space and real estate is used, across many industries and will be able to provide normative data and advice and for consultation with users about best use and productivity of their space. In one embodiment, collected utilization data is stored and/or aggregated into a central database/warehouse. The data may be anonymized and/or normalized. The aggregated data may then be used, for example, to provide exemplars to those seeking projections of potential space utilization or to contextualize a particular utilization, such as to compare a given space utilization against space utilization generally across a particular industry. This knowledge base may be maintained by a third party with analysis based thereon provided as a service to customers. Alternatively, an entity may maintain such a database for their own purposes in assessing their own space utilization.

Other applications of the disclosed embodiments include:
1) Broader business applications, such as:
   a) Subscription to aggregated occupancy data, both raw and processed;
   b) Trend analysis by industry, usage type;
   c) Comparative product analysis;
   d) Occupancy level and warning (events), for example, building occupancy levels relative to maximum capacity. As capacity reaches maximum allowable, warning messages can be sent;
   e) Scheduling;
   e) Research;
   f) Posture analysis;
   g) Movement frequency;
   h) Life safety devices;
   i) Adjust noise cancellation, such as based on chair location;
   j) Product research and development, such as by an office furniture company; or
   k) Availability of space.
2) Cross selling opportunities:
   a) sales of complementary products based on space usage, such as additional furniture; or
   b) sales of upgraded or higher capacity products based on space usage.

Prior occupancy systems utilized periodic "bed checks," e.g. physically checking occupancy of a given space, binary determinations, such as by using physical switches, control points, such as badge-swipes, phone or computer utilization, such as log in or keystroke monitoring, or motion detection, such as camera, infrared or thermal based. While the disclosed embodiments may be utilized with such occupancy detection systems, these systems provide less than accurate occupancy detection and often reflect false positive or false negative data, such as from lack of movement by an occupant, and may be subject to counter-measures or tampering, such as by derelict or dishonest employees. Some of these occupancy detection systems, e.g. camera based, may raise privacy concerns among those being studied and, therefore may be less optimal due to the detrimental psychological effects or effect on workplace satisfaction, which may ultimately affect the occupancy results, e.g. by causing employees to stay home.

To substantially avoid or minimize such inaccuracies, in one disclosed embodiment, occupancy of a given physical space, such as an office building or portion thereof, is determined based on measurements of the utilization of physical elements located with the space which are typically utilized by one occupant at a time, such as a chair or workstation, e.g. on a micro-level, rather than on, for example, a room or office level. Such determinations may be made on a temporal basis, e.g. time, day, week, month, or year, and/or a spatial, physical and/or geographic basis, e.g. room or building. Utilization of the physical element is determined by physically attaching a sensor, such an accelerometer, or other load sensor, to the physical element, and sensing the acceleration or load on the physical element presumably caused by the occupant. In an alternative embodiment, remote sensing technologies and appropriate support infrastructure, such as thermal or optical based sensing, may be utilized where the technology permits the requisite occupancy determination. For example, the sensor may determine the probability that an occupant is utilizing the physical element, referred to as a probable utilization state, by measuring, over a period of time, magnitude values which each represent the magnitude of movement of the physical element. The measured magnitude values may be analyzed or otherwise combined to generate an overall indication of the probability that an occupant is utilizing the physical element during the given period of time. For example, a chair may be configured with an accelerometer-based sensor which senses the magnitude of the acceleration of the chair at any given moment. The sensor may then sample the magnitude values reported by the accelerometer periodically, such as every 15 seconds, over a period of time, such as 10 minutes, and aggregate or combine the sampled values to generate an aggregate value. The aggregate value may then be indicative of the likelihood that the sample magnitude values sensed by the accelerometer were caused by an occupant sitting in the chair rather than some other cause, such as wind, vibrations or otherwise. In one embodiment, these aggregate values are reported wirelessly to a data collection device, directly or indirectly, such as the concentrator or gateway controller devices described above. The data collection device may contain or further relay the data to a backend system, such as a data collection service, vendor, etc. as described above, where the data is collected, aggregated and/or analyzed to contextualize the data as described herein.

As described above, accelerometer based sensors may be utilized. Accelerometers determine the change, both increases and decreases, in velocity of the attached physical element as a function of time. While accelerometers may further be used to determine direction of movement, in one embodiment, such information is not determined and, accordingly, only a single sensor may be required. Alternatively, direction of movement may be utilized in conjunction with magnitude to bolster the accuracy of the occupancy determination, which may require the use of more than one sensor, depending upon the implementation and the number of axes of movement to be detected. In one embodiment, the sensors are attached to chairs, such as with Velcro or other physical attachment, so as to be unobtrusive while being associated with a physical element, the utilization of which is highly indicative of occupancy. Alternatively the sensors may be associated with other physical elements, alone or in combination, the utilization of which is also likely indicative of occupancy. It will be appreciated that other types of sensors and associated circuitry may also be used with the disclosed embodiments, including piezoelectric, capacitive, optical, thermal or mechanical based sensors which sense load, strain, electrical potential, temperature or other parameter indicative of the likelihood of occupancy.

In one embodiment, the sensor, also referred to as a "mote," includes the sensor device, e.g. accelerometer, power source, such as battery or self powering mechanism, processor to control operations and a radio for enabling wireless interactions as described. The mote may further include operational indicators, such as LED indicators, controls, such as an on/off switch, a test switch, and wired interfaces, such as a serial or USB port for interacting with the mote directly. The mote may further or alternatively include wireless interfaces for close proximity interaction, such as an infrared, Zigbee, RFID or Bluetooth interface. Motes may further feature a fixed or programmable identification code, such as a serial number, programmed into the device, and possibly marked on the exterior surface of the device as well, which may be reported in concert with any data so as uniquely identify the source of the data. The sensor may further include a memory or other storage, such as a non-volatile RAM, coupled with the processor, for storing measured values, calculated values as well as historical data. When communicated data, the sensor may use a defined data or packet structure having specifically defined fields for containing data and other information necessary to effect communications.

In one embodiment, the mote is manufactured by Point Six Wireless, located in Lexington, Ky. and transmits at a frequency of 418 MHz (433 MHz in Europe), sampling the accelerometer and reporting, for example, every 15 seconds. Alternatively, the mote may sample the accelerometer every 15 seconds, or at some other sampling rate, but report on a larger interval, such as every 5, 10 or 15 minutes. When the reporting interval encompasses more than one sampling interval, the mote, at the time of reporting, may report all of the individual sample values determined during the interval or otherwise aggregate the individual values into a single value, such as an average value, maximum value, minimum value, etc., for reporting. In one embodiment, the mote implements a scoring algorithm to accumulate and process the 15 second samples/measurements accumulated during the reporting window into a single value to be reported. The mote may further implement a pseudo-randomized historical reporting algorithm whereby the present aggregate value or sample is reported together with multiple randomly selected previously reported values, selected from a set of previously reported values stored in a memory within the mote, the algorithm developed by Ad Hoc Electronics, located in Orem, Utah. In this embodiment, the motes communicate with a concentrator and/or gateway controller, such as the PointManager, PointRepeater or Soekris Net5501 described above, also provided by Point Six Wireless and/or Ad Hoc Electronics. The concentrators collect and forward reported data to the gateway controller. In one embodiment, the concentrators may forward data using SFTP, HTTP post operations, proxy operations or other forwarding or pass-thru mechanism.

According to one embodiment, a method of facilitating management of occupancy of a first physical space is provided, wherein the first physical space includes a plurality of physical elements typically utilized by one occupant at a time. In one embodiment, at least one of the physical elements comprises a seat, such as a chair, wherein the probable utilization state of the seat is indicative of whether an occupant is occupying the seat. Alternatively or in addition thereto, at least one of the physical elements comprises a work surface, such as a desk or workstation, wherein the probable utilization state of the work surface is indicative of whether an occupant is working at or on the work surface. It will be appreciated that the physical elements may include other elements, such as furniture, doors, drawers, carts, easels, window treatments, etc. typically used by a single occupant at any given time.

FIG. 1 shows a block diagram depicting data flow in an exemplary utilization monitoring and analyzing system 100 for facilitating management of occupancy of a first physical space, the first physical space comprising a plurality of physical elements, such as seats or work surfaces, typically utilized by one occupant at a time.

The system includes a receiver 120 portion and analytical portion including an evaluation processor 122 and contextualization processor 124. The receiver 120 may include one or more concentrators 104 and/or optionally one or more gateway controllers 106 coupled with the concentrators 104. Herein, the phrase "coupled with" is defined to mean directly connected to or indirectly connected through one or more intermediate components. Such intermediate components may include both hardware, wired or wireless, and software based components. In implementations using concentrators 104, the concentrator 104 receives the data that is transmitted, e.g. wirelessly, by the motes 102. In one embodiment, there is one concentrator 104 for every approximately 30 motes located proximate to the general location of the motes 102. In smaller implementations with fewer motes, the function of the concentrator 104 may be subsumed by the gateway controller 106. The gateway controller 106 collects, either via wired or wireless connection, e.g. LAN, the data from the concentrators 104, or directly from the motes 102, for transmission to the evaluation 122 and contextualization 124 processors, i.e. the back-end or data collection system (DCS) 112. Generally, the receiver 120 is operative to receive at least a portion of a plurality of probable utilization states. Each of the plurality of probable utilization states having been determined over a first period of time, such as 10 minutes, for one of the plurality of physical elements, e.g. seat or work surface, based only on a plurality of magnitude values each representative of a magnitude of movement of the physical element during a discrete portion of the first period of time, e.g. 15 second interval. The probable utilization state is indicative of a likelihood that at least one occupant is utilizing the one physical element, e.g. sitting in the seat or working at/on the work surface, and therefore occupying at least a portion of the first physical space during the first period of time. In some cases, the mote 102 may delay reporting probable utilization states and therefore report them during a second period of time different from the first period of time.

The system 100 further includes an evaluation processor 122 and contextualization processor 124. The evaluation processor 122 is coupled with the receiver and operative to evaluate at least a portion of the received portion of determined probable utilization states to determine a number of occupants occupying at least a portion of the physical space, i.e. the evaluation processor 122 determines whether an occupant is substantially likely to have caused the movement based on which the associated probable utilization state was determined. In one embodiment, the evaluation processor 122 is further operative to determine the remaining, e.g. missing, probable utilization states which were not received based on the first period of time, i.e. the evaluation processor 122, having knowledge of the reporting interval, may determine which data is missing and, for example, reconstruct the missing data, such as by extrapolation to determine a number of occupants indicated thereby. In an alternative embodiment, the evaluation processor 122 may combine the received data from multiple motes 102 and/or receive additional inputs, such as the status of the lights in the room, historical security badge reports, motion detector reports or other data which may substantially confirm that the probable utilizations states are in fact indicative of an occupant as opposed to a false positive. In an alternative embodiment, the functionality of the evaluation processor 122 may be implemented within the mote 102 whereby the mote 102 reports occupancy of the physical element on a binary basis.

The contextualization processor 124 is coupled with the evaluation processor 122 and operative to contextualize the determined number of occupants to facilitate management of the occupancy of the first physical space. For example, the contextualization processor 123 may determine occupancy of at least a portion of the first physical space at a specific time based on at least the received determined probable utilization states and demonstrate utilization of the portion of the first physical space at the specific time. In another example, the contextualization processor 124 may determine occupancy of at least a portion of the first physical space at a plurality of specific times based on at least the received determined probable utilization states and demonstrate a change in occupancy of the portion of the first physical space over a period of time encompassing the plurality of specific times. In another example, the contextualization processor 124 may correlate occupancy of at least a portion of the first physical space to at least one event based on at least the received determined probable utilization states. In another example, the contextualization processor 124 may compute an index value representative of at least the received portion of the plurality of probable utilization states. For example, a "Facility Operation Efficiency Index" value may be calculated as follows:

A=Overall Average Occupancy Rate (%)
B=100−(maximum percentage of offices in use concurrently)
C=100−(minimum percentage of offices in use concurrently)
D=Percentage of offices that were considered "in-use". Each office is either considered "in-use" or "not in-use" for the time being considered. It has the effect of a typical bed-check, but can be based on sensor data.

Where: Index=$(A+B+C+D)/4$

This index can be calculated for an instant in time or over a period of time. It can also be applied to any level of plurality of spaces for a given study. It will be appreciated that other index values may also be computed.

In another example, the contextualization processor 124 may correlate occupancy of at least a portion of the first physical space to at least one attribute thereof based on at least the received determined probable utilization states, wherein the attribute may include location, environmental conditions (e.g. temperature, relative humidity, concentrations of allergens or volatile organic compounds, atmospheric pressure, electro-magnetic fields, etc.), available amenities, decor, electrical consumption or combinations thereof. In another example, the contextualization processor 124 may aggregate the received determined probable utilization states with previously received determined probable utilization states and contextualize at least the received determined probable utilization states based on the aggregation. The previously collected determined probable utilization states may have been received for a second physical space different from the first physical space or, alternatively, the previously received determined probable utilization states may have been received for a second physical space operated by an entity different than that which is associated with the first physical space.

The evaluation processor 122 and contextualization processor 124 may be implemented in hardware, software or a combination thereof. In one embodiment, the evaluation processor 122 and contextualization processor 124 are implemented as functions of the data collection server 112 and workplace utilization data warehouse 114. The data collection server 112 is coupled with the gateway controller(s) 106, such as over a network, e.g. the Internet, 118. The gateway controller 106 reports or otherwise transmits the collected data, periodically in batch, continuously, or otherwise, to the data collection server 112. The received data is then stored in the workplace utilization data warehouse 114, which may comprise a database, such as a relational database, for subsequent analysis. Alternatively, the evaluation processor 122 and contextualization processor 124 may be implemented separately (not shown) and be coupled with the workplace utilization data warehouse 114 to retrieve and subsequently analyze data.

In one embodiment, there are several sources of data that ultimately flow back to the Workplace Utilization Data Warehouse 114. All raw sensor data flows from the motes 102 to the concentrator 104, if used, to the Gateway Controller 106 where it may be logged with a timestamp. Additionally, all mote 102 assignments may be made during an installation using a barcode scanner 108 coupled with a computer 110 and a web page hosted by the Gateway Controller. This association between a particular mote device 102 and an asset/location is also stored in a local database with a timestamp. All of this data, along with basic diagnostic system information may be transmitted via the Internet to a DCS 112 or collection. The DCS 112 then parses all data and loads it into a Workplace Utilization Database 114 where it can be analyzed and reported upon, then added back to the Workplace Utilization Data Warehouse 114 if warranted. A customer website portal 116 may further be provided to allow a customer to interact with the vendor to retrieve reports, or create, read, update or delete contextual information, etc.

There is potential for some data to be transmitted from the DCS back to the Gateway Controller. This would be desirable to make the latest space definitions available via the web interface on the Gateway Controller. These space definitions could then be utilized to make the mote assignments through the web interface on the gateway controller.

Figure 6:
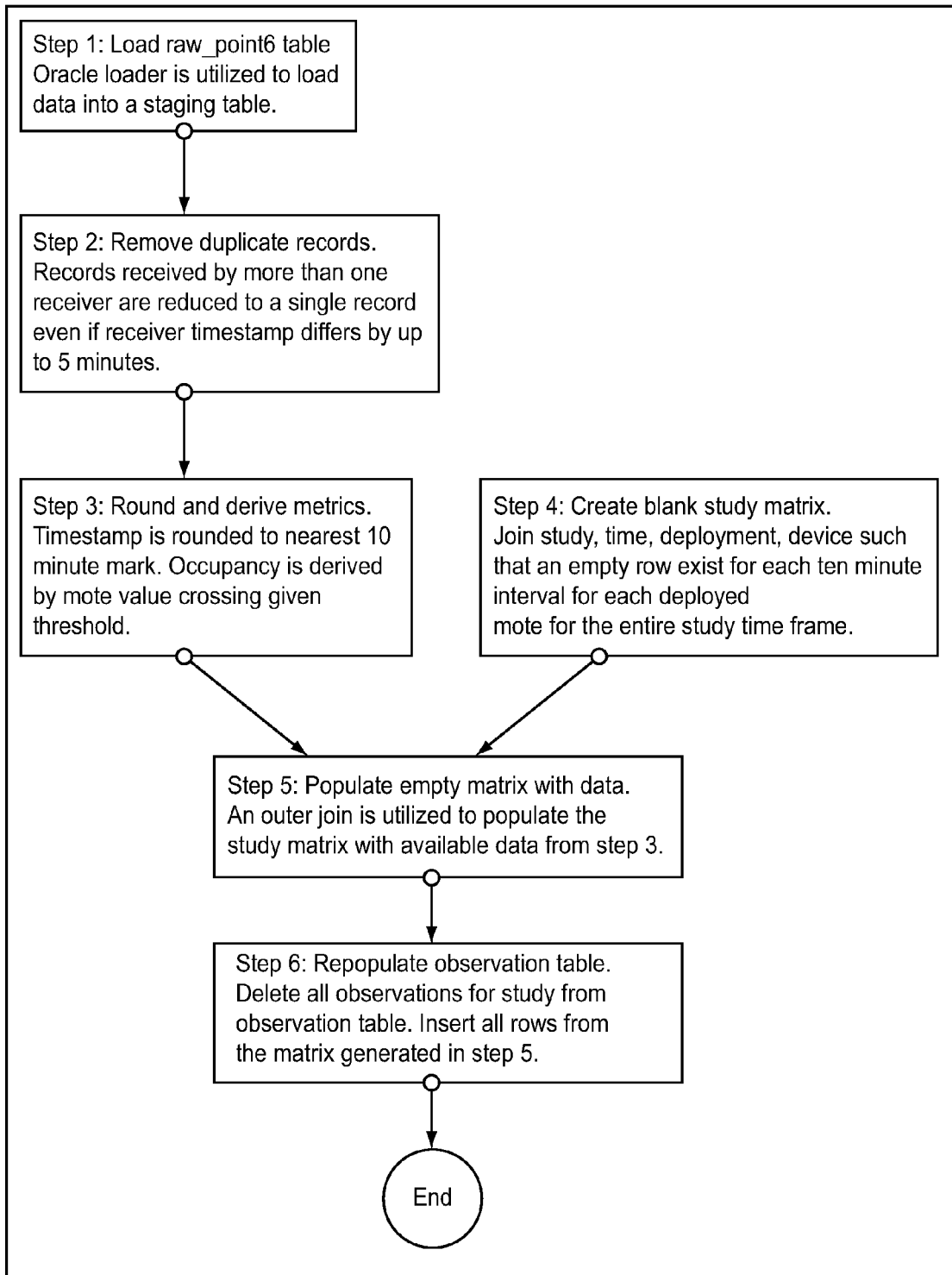
FIG. 6 depicts an exemplary series of steps to load raw mote and deployment data received from a gateway server into a database for use with the disclosed embodiments.

FIG. 6 depicts an exemplary series of steps to load raw mote 106 and deployment data 108 received from a gateway controller 106 into a database 114 for use with the disclosed embodiments. As shown in FIG. 6, all raw mote 102 data and deployment data 108 is temporarily staged on the gateway controller 106. After a predetermined interval of time, the data is exported into a common data exchange format (currently CSV) and transmitted from the gateway server to a Data Collection Server (DCS) 112. There are many possible methods of transmission including LAN-based Internet connections, cellular networks, and modems. Whatever the method of transport or data format, the DCS 112 is responsible for processing the data and loading it into a database 114. There are a series of steps that are applied to the entire data set which ultimately load an "Observation" table in the database. The general process sorts, removes duplicates, filters and joins the data to produce a base fact style table for reporting. Exemplary detailed code is contained in Appendices A and B.

Figure 8A:
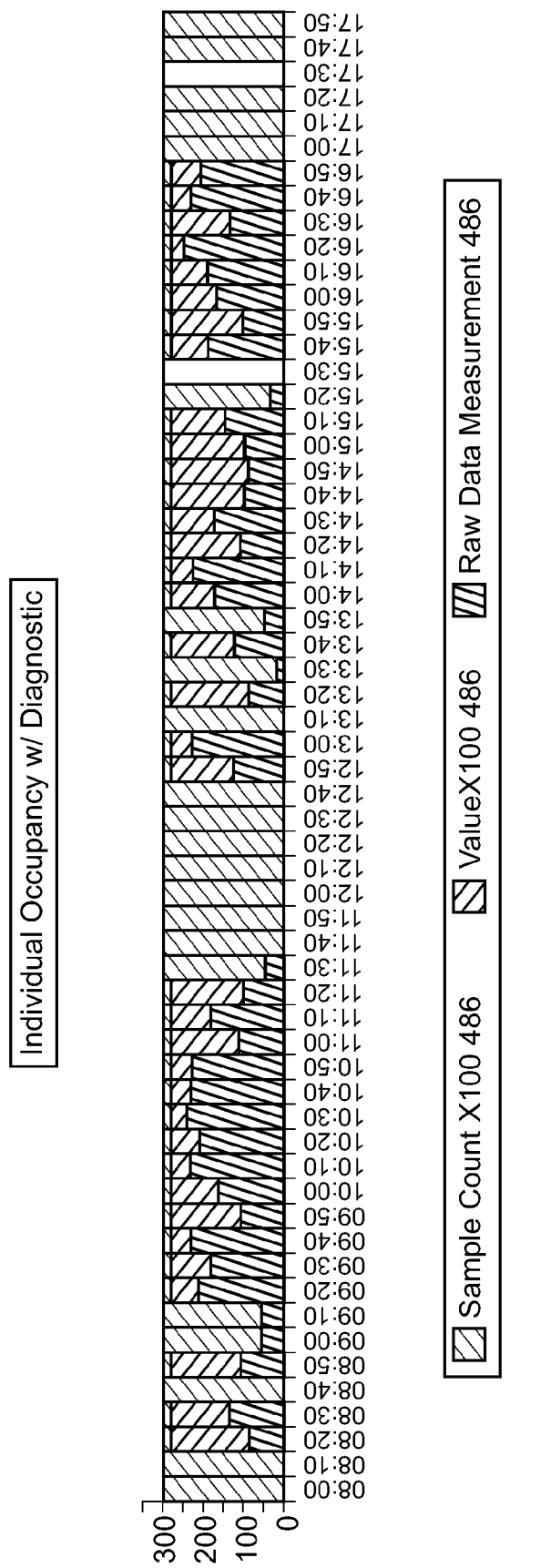
FIGS. 8A-8U depict exemplary charts, graphs and other reports which demonstrate methods of contextualizing occupancy data according to the disclosed embodiments.

The steps identified here for the DCS 112/evaluation processor 122 ultimately take a raw data record and transform it into an occupancy indicator within the context of a physical space at a specific time. FIG. 8A shows a diagnostic chart of an individual mote. This chart illustrates the nature of the raw data which is used to determine occupancy for each 10-minute interval. Notice that there are samples where the raw measurement is greater than zero, but below a minimum threshold for occupancy. The samples taken at 9:00 and 9:10 may indicate that a person was there for only a portion of the interval or perhaps was quite still during the interval. The minimum threshold is configurable and in this case, is perhaps set too high.

There are many additional attributes that can be captured for a study of workplace utilization conducted using the disclosed embodiments. An exemplary comprehensive description of an exemplary set of attributes stored in the workplace utilization (occupancy) database 114 can be found in the Business Objects Data Dictionary table below. It will be appreciated that other attributes may be provided and that some of the listed attributes may not be utilized. In addition to the static attributes, this table also describes some of the key calculated values for measuring workplace performance such as average utilization.

Table: Business Objects Data Dictionary

1. Business Objects Data
    Business Objects Enterprise is a database reporting tool that hides many of the complexities of a relational database system. It can manage complex relationships between database elements so it is possible for someone to create reports without having to understand all of the intricacies of the database schema design. This is done through the creation of Business Objects Universes, which define user-friendly names (descriptors) and links them to the underlying database elements.
1.1. Time
    The Time dimension represents all the elements of a time stamp that would be associated with a measurement or study. It conveniently provides each component of a time stamp so formatting functions do not have to be used for each time a component of time is needed report.
    1.1.1. Day of Month
        This variable represents a number between 0 and 31 representing the day of the month in a date.
        1, 2, 3, 4, 5, . . . , 31
    1.1.1. Day of Week ID
        This variable represents a number between 0 and 6 representing the days of the week starting on Sunday.
        0=Sunday, 1=Monday, 2=Tuesday, 3=Wednesday, 4=Thursday, 5=Friday, 6=Saturday
    1.1.2. Day Abbreviation
        This variable represents a two character abbreviation for each day of the week.
        SU=Sunday, MO=Monday, TU=Tuesday, WE=Wednesday, TH=Thursday, FR=Friday, SA=Saturday
    1.1.3. Day Name
        This variable represents the full name of each day in a week.
        Sunday, Monday, Tuesday, Wednesday, Thursday, Friday, Saturday
    1.1.4. Day Type ID
    1.1.5. Description
    1.1.6. Hour
        This variable represents the hour of the day in the form of a number between 0 and 23.
        1, 2, 3, 4, 5, . . . , 23
    1.1.7. Meridian
        This variable is an indicator of morning or afternoon for a day.
        AM, PM
    1.1.8. Minute
        This variable represents the minute of the hour in the form of a number between 0 and 59.
        0, 1, 2, 3, . . . , 59
    1.1.9. Month
        The 12 months of the year.
        January, February, March, April, May, June, July, August, September, October, November, December
    1.1.10. Observation Times
        This variable represents a fully qualified timestamp for each 10-minute interval beginning on 06/19/2007 going through 06/27/2012.
        All the other fields in this table are subsets of this timestamp.
        2007-06-19 00:00:00, 2007-06-19 00:10:00, . . . , 2007-06-27 23:50:00
    1.1.11. Year
        This variable holds the four-digit number for the year.
        2007, 2008, . . . , 2012

1.2. Device

The Device dimension contains records for all motes, receivers, gateway servers, and barcode scanners in Herman Miller's inventory.

1.2.1. Barcode ID

This variable represents the unique barcode number printed on the device. In the case of motes, it is the device serial number assigned by the manufacturer.

70847160, 70860168, . . .

1.2.2. Device ID

An sequential index number used as a primary key in the database that is automatically assigned when a new record is inserted into the Device table. This can be used to show data from an individual mote anonymously. The Device ID does not contain any information about the device serial number, barcode, or location.

103, 234, 567, . . .

1.2.3. Device Type ID

This variable is a foreign key to the Device_Type table, which defines the models of equipment.

HMI Custom Prototype, PointSensorVibration, Single-band PointMgr,

Dual-band Point Mgr, 7202 Home Controller 1.2.4. Node Name

This variable is currently not used, but it could contain a user-friendly name for each device such as red1-1.

1.2.5. Received Date

This variable represents the date that Herman Miller received the device from the manufacturer.

1.2.6. Serial Number

This variable represents the manufacturer's assigned serial number. Typically, this value is also used as the Barcode ID.

1.3. Observation

The Observation table is the central repository that links all information about occupancy measurements for a particular space, device, and time. In a star schema, this would be the center of the star. All occupancy related reports require the data in this table.

1.3.1. Device ID

Foreign key to the Device table uniquely identifying the device reporting the observation.

1.3.2. Metric Name

This variable represents the type of observation metric being reported. Initially, the only value for this is "Occupancy" because that is what the Point Six motes are capable of measuring.

1.3.3. Observation Times

This variable represents the fully qualified timestamp of the observation. This is also they key that links the observation to the Time table using its Observation Times variable.

2007-06-19 00:00:00, 2007-06-19 00:10:00, . . . , 2007-06-27 23:50:00

1.3.4. Space ID

This variable is a foreign key that represents the individual space defined in the Space table. This could possibly be removed from Business Objects.

1.3.5. Study ID

This variable is a foreign key that represents the individual study defined in the Study table. This could possibly be removed from Business Objects.

1.3.6. Value (Dimension)

This variable represents the occupancy of an observation in a text format. It can probably be removed from Business Objects.

1.3.7. Raw Data Measurement

This important variable represents the actual digital occupancy measurement from a mote for a given 10-minute interval. It represents the amount of activity that took place in that interval, and is used to determine the occupancy defined in the Value variable. The more activity detected in that interval, the higher the number. It has a range from 0-255, where represents no activity and 255 represents continuous high activity for 10 minutes.

0, 1, 2, 3, . . . , 255

1.3.8. Sample Count

This Boolean variable indicates whether or not a sample was received from a given mote for a particular 10-minute interval.

1.3.9. Value (Represents Occupancy)

This critical variable is the primary indicator of occupancy for an individual observation. It is set as a Boolean, based on the "Raw Data Measurement" value. If the "Raw Data Measurement" is above a certain threshold, then this variable is set to 1. If the "Raw Data Measurement" is below that threshold, then this variable is set to 0. The threshold value can be set for use during the data load operation. The "Value" variable would more appropriately be called "Occupied", "Occupancy Indicator" or something similar. It is the variable that must be used to calculate all occupancy data.

0 or 1

1.4. Study

The Study dimension defines all the metrics associated with a particular customer engagement. The concept of a study is essential to this schema design and all space, device usage, deployment, observation and related data is linked to a Study. Under most circumstances, the Study should be used as a filter on any Business Objects report.

1.4.1. Campus

This variable describes the customer campus where the study is taking place.

1.4.2. City ID

This variable is a foreign key that points to the City table. Any City that hosts a study should be represented in the City table and linked to the study through its Study ID.

1.4.3. Continent ID

This variable is a foreign key that points to the Continent table. It is anticipated that this will be useful when the number of studies in a database grows to be quite large and trend analysis can show comparative data by continent.

1.4.4. Country Code

This variable is a foreign key that points to the Country table. It represents a unique identifier for every country in the world.

1.4.5. Customer ID

This variable is a foreign key that points to the Customer table. The Customer table holds all the attributes for a particular customer.

1.4.6. Description

This variable is just an open text field that allows informational comments to be attached to a particular study.

1.4.7. End Date
  This important variable defines the end date for a study. This date is used to clip off any data beyond the agreed upon end date. It is also used as the default end date for every deployment assigned to a study. It is used in conjunction with the "End Date" variable to limit the number of records inserted into the Observation table.
1.4.8. GMT Offset
  This variable provides an offset to adjust all observation data to the local time zone for the study. All observation data is stored in GMT, but this variable is used to convert it to local time during the data loader process.
1.4.9. Region ID
  This variable is a foreign key that points to the Region table. The Region table contains records for every state or province in which a study takes place.
1.4.10. Start Date
  This important variable defines the start date for a study. This date is used to clip off any data prior to the agreed upon start date. It is used in conjunction with the "End Date" variable to limit the number of records inserted into the Observation table.
1.4.11. Study ID
1.4.12. Study Number
1.4.13. Study Status ID
1.5. Job Function
  1.5.1. Job Function ID
  1.5.2. Job Function Description
1.6. Space
  This important table defines all attributes that relate to the physical location which is to be monitored by a mote. These are key elements for the reporting process and extensible. The table contains (but does not enforce) a hierarchical structure following the OSCRE (Open Standards Consortium for Real Estate) standard for describing real estate. This hierarchy follows the form of Building ☐ Floor ☐ Room_Space ☐ Asset.
  1.6.1. Asset
    The Asset variable is the lowest level of space definition. It represents the physical object to which a mote is attached. Typically, this is a chair, but it is possible to attach motes to other objects such as work surfaces, tables, cabinets, etc.
  1.6.2. Assigned Indicator
    This variable is a Boolean field that represents whether or not a space is assigned to an individual or not. The values are currently single characters (a=assigned, u=unassigned). A campsite is an example of an unassigned space.
    a, u
  1.6.3. Building
    This variable identifies the building being in which a study is taking place.
  1.6.4. Floor
    This variable identifies the floor or wing of a building in which a study is taking place.
  1.6.5. Job Function ID
    This variable is a foreign key to the Job_Function table, which contains classifications of job functions.
  1.6.6. Occupant Name
    This field can contain a real or artificial name of the person to which the space is assigned.
  1.6.7. Planning Group
    This field contains an arbitrary label to correlate data for groups of related spaces. For example, it could be used to define departments, work teams, or job classifications.
  1.6.8. Room Space
    This variable identifies the room or area within a floor that contains the asset being monitored. An example of this could be the name of a conference room, a cubicle, private office, or designated area within a floor.
  1.6.9. Room Space Type ID
    This variable is a foreign key to the Room Space Type table which describes a defined list of space types.
  1.6.10. Space ID
    This variable is an artificial primary key to the space table to uniquely identify every space within a study.
  1.6.11. Study ID
    This foreign key to the Study table associates the record for the space to specific study.
  1.6.12. Worker Type ID
    This variable is a foreign key to the Worker Type table which describes the definitions for typical types of workers.
1.7. Room Space Type
  This table describes all the attributes of a typical room/space being monitored.
  1.7.1. Room Space Type Description
    This variable is a long description explaining the type of room or space.
  1.7.2. Room Space Type ID
    This variable is an artificial primary key to uniquely identify a record.
  1.7.3. Room Space Type Name
    This variable is a concise, but user-friendly identifier for a room or space.
1.8. Worker Type
  This table defines a list of worker types to allow categorization in reporting.
  1.8.1. Worker Type Desc
    This variable is a concise, but descriptive label for a type of worker.
  1.8.2. Worker Type ID
    This variable is an artificial primary key to uniquely identify a record.
2. User Defined Variables
  2.1. Section Date
    The "Section Date" variable can be added to any report where charts or tables are to be grouped by date. A new section can be created by dragging this variable onto the report body. It will automatic group the data by date, thus creating a new chart for each day.
    Section Date=FormatDate(<Observation Times>, "Mmmm dd, yyyy Dddd")
  2.2. Expected Sample Count
    This diagnostic variable counts the number of expected samples coming from the motes. It uses the fact that the database preloads every 10-minute interval for a study into the Observation table. Since every mote should report at least once every 10 minutes, counting the number of intervals gives you the expected sample count.
    Expected Sample Count=Count(<Observation Times>)

2.3. Occupancy Rate

The Occupancy Rate is the percentage of space capacity that is actually in use. It can be calculated by summing the observation values and dividing them the number of expected observations.

Occupancy Rate=<Value>/<Expected Sample Count>

2.4. Sample Completion Rate

The Sample Completion Rate is a diagnostic measure that calculates a percentage of samples that were received compared to the number of samples that were expected for a given period of time. This measure relates directly to the confidence of the data. If the sample completion rate is low, then there may not be enough observation data to make a legitimate estimate of the utilization of a space. Missing samples are expected due to collision of wireless signals, wireless interference or blockage, poor receiver coverage, or possibly a timing issue in which the sample period exceeds the ten minute sample window. Regardless, the sample completion rate should be close to 100% if the wireless network is performing well. This number will increase with the use of the data reconstruction algorithms used during the data load process.

Sample Completion Rate=<Sample Count>/<Expected Sample Count>

2.5. Capacity

The Capacity is essentially the number of motes deployed to a space. For example, if a conference room has 8 chairs, then one device should be deployed to each chair. In this scenario, the utilization of this space versus the capacity can be quite informative.

Capacity (Mote Count)=Count(<Device ID>)

WARNING—If the number of motes deployed to a space does not match the number of chairs in that space or is not a one-to-one mapping, then this calculation is flawed. In that case, one might calculate Capacity by counting the number of Assets.

Capacity (Asset Count)=Count(<Asset>)

Exemplary attributes/calculated values include:

Section Date=FormatDate(<Observation Times>, "Mmmm dd, yyyy Dddd")

Expected Sample Count=Count(<Observation Times>)

[Occupancy]Value=if RAW>Low_Threshold, then Value=1, else Value=0

Occupancy Rate=<Value>/<Expected Sample Count>

Sample Completion Rate=<Sample Count>/<Expected Sample Count>

Capacity (Mote Count)=Count(<Device ID>)

These calculations can be performed using standard database reporting tools. The following sections will show examples of the output.

Figure 4:
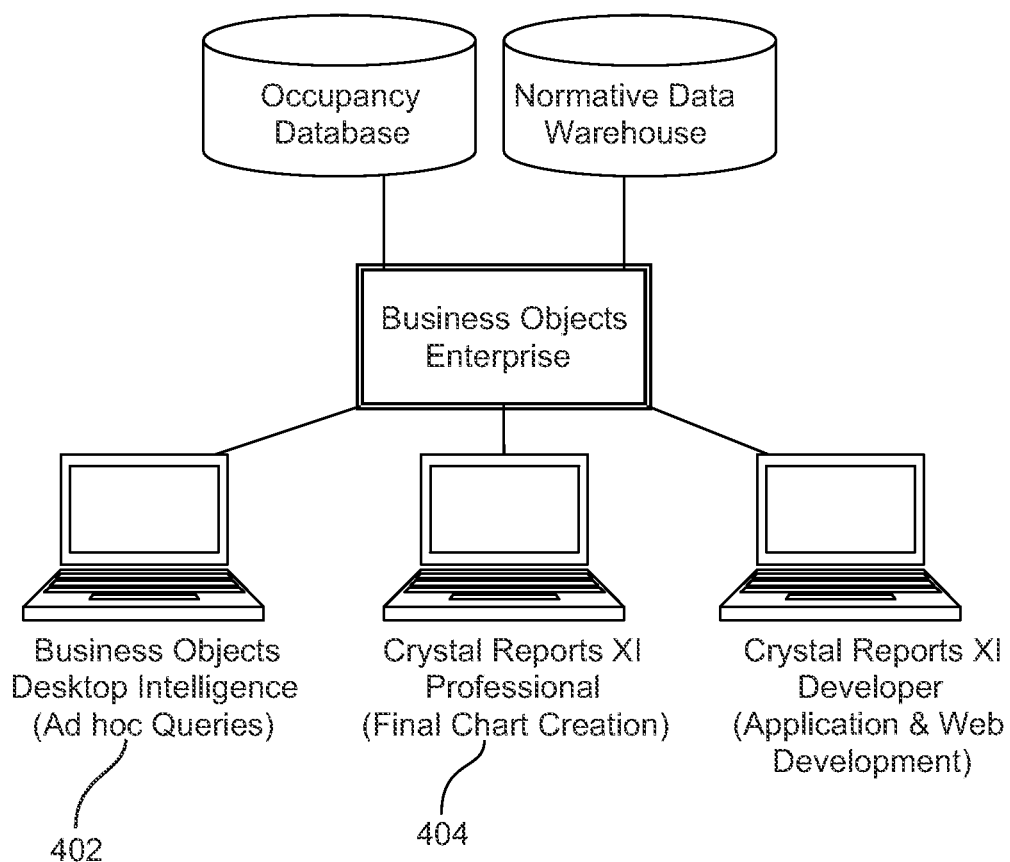
FIG. 4 depicts a block diagram showing the two primary "front-end" interfaces to Business Objects Enterprise server reporting engine.

In one embodiment, the Business Objects Enterprise server is used as the standard engine for all enterprise database reporting needs. As shown in FIG. 4, the two primary "front-end" interfaces to this reporting engine are Business Objects Desktop Intelligence 402 and Crystal Reports 404. Desktop Intelligence 402 (commonly called Business Objects client) is a tool for quickly querying a database and visualizing the results in simple charts and tables. It is intended to provide "end-users" with access to data without requiring specific experience in database systems or programming. Crystal Reports 404 is the "advanced" front-end interface to enterprise data systems. It is capable of producing much more sophisticated charts and tables which can be highly customized to conform to the graphic design guidelines that would be required for market-facing or executive-level reports. Crystal Reports 404 is recognized as an industry standard tool for creating publication quality charts and tables, however, it requires some level of programming experience. Together, Desktop Intelligence and Crystal Reports can be used to meet a variety of reporting needs.

Figure 2:
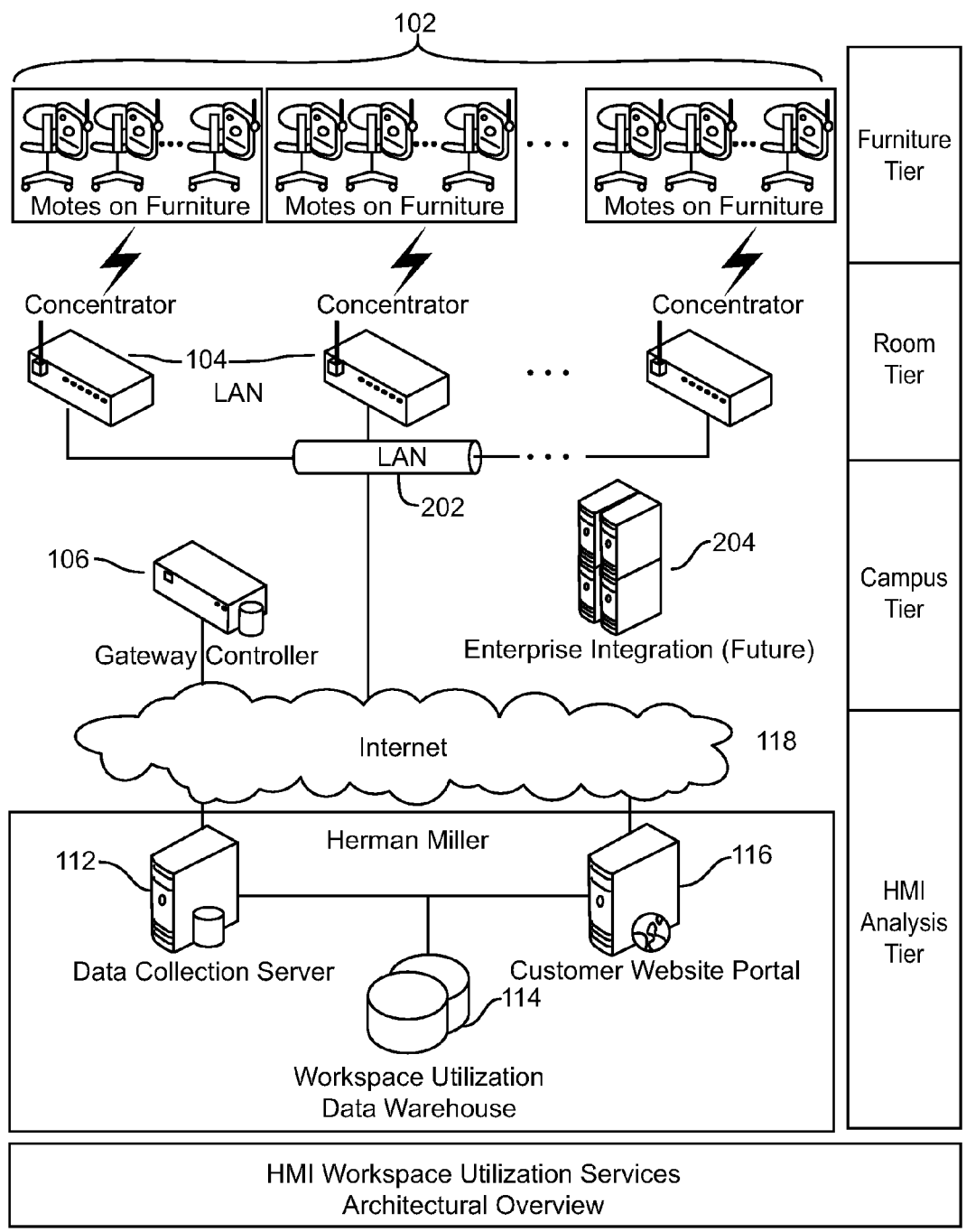
FIG. 2 depicts shows a block diagram depicting an exemplary system architecture according to one embodiment.

FIG. 2 shows a block diagram depicting an exemplary system architecture according to one embodiment. The depicted architecture employs four technology tiers to capture, aggregate and transmit workplace utilization information for analysis, monitoring, and historical trend reporting. FIG. 2 further identifies the relationship between those tiers.

The furniture tier uses motes 102 to sense movement in a chair or other physical element within a space, e.g. at a customer facility. Raw motion data is then wirelessly transmitted from the various motes 102 to one or more concentrators 104 at an area level. Concentrators 104 may be located within approximately 300 feet of the motes 102 which report to it, though this may vary with the implementation.

The room tier consists of concentrators/receivers 104 at a customer facility that aggregate the data from all motes inside an approximate radius, such as 150 feet, for example, depending upon environmental conditions and/or the type of communications technology utilized. This data is then transmitted, such as through a corporate LAN, to a gateway controller 106 at the campus tier. In smaller configurations, motes 102 may simply directly forward all mote data to the concentrators/receivers 104 which then send the data directly to the back-end systems without need for a gateway controller 106.

The campus tier consists of an optional gateway controller 106 located at a customer facility. It may be recommended that a gateway controller 106 be used for deployments of more than one or two concentrators 104. The gateway controller 106 aggregates the data from all concentrators 104 across a campus into a temporary storage database (not shown). On a regular schedule, or alternatively, continuously, this data is then transmitted to back-end systems for analysis and purged from the local gateway controller 106. Data may be archived on the gateway controller for a limited duration in the event of connectivity problems to the Data Collection Server (DCS) 112 in the Analysis Tier.

As a future offering, workplace utilization monitoring could become a permanent fixture. In this situation, the gateway controller 106 could provide near real-time access to data processing and reporting. It is also possible to support integration with Computer Aided Facility Management ("CAFM"), Active Directory, a Light Weight Directory Access Protocol ("LDAP") based database of user information that may store user information and credentials for network authentication (e.g. by associating a particular mote with a user's Active Directory profile), HR/Security, and other enterprise systems.

The analysis tier stores all data from all deployments, anonymized in some implementations, into a workplace utilization data warehouse 114 at the back-end for value-added analysis and reporting, such as via PDF files, dynamic reporting tools or other reporting mechanism such as a rich client or web based application.

A proposed web interface may provide a Graphical User Interface offering a full range of interaction tools for a spectrum of customer employees. A security model could also be developed to present targeted content to customer facility and real-state personnel, executives, occupants, and installers. This user interface could allow customers to create and modify study metadata and tailor custom reports through a dynamic website.

FIGS. 3A and 3B depict alternate implementations of the above architecture with and without a gateway controller 106. In implementations without a gateway controller 106, the concentrators 104 may interface directly with the DCS 112, such as via a network, e.g. the Internet.

Figure 9:
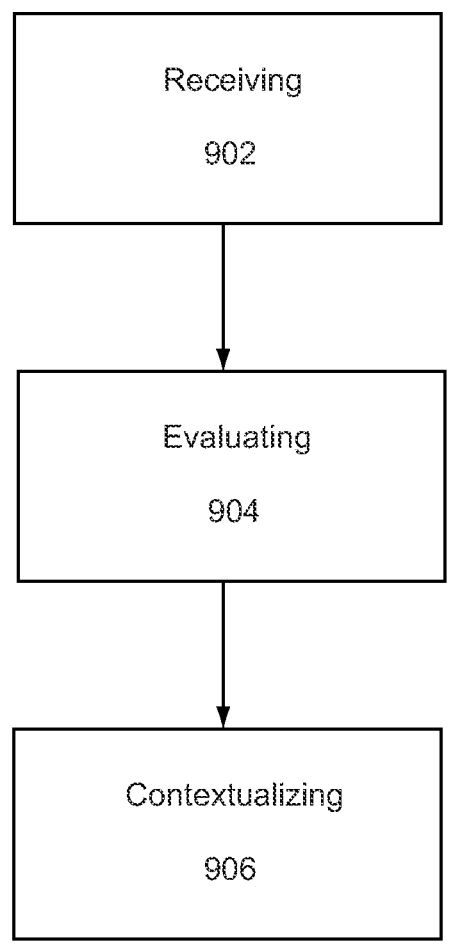
FIG. 9 depicts a flow chart showing the process of analyzing occupancy according to one embodiment.

Referring to FIG. 9 the method includes receiving at least a portion of a plurality of probable utilization states, each of the plurality of probable utilization states having been determined over a first period of time for an associated one of the plurality of physical elements based only on a plurality of magnitude values each representative of a magnitude of movement of the physical element during a discrete portion of the first period of time, the probable utilization state indicative of a likelihood that at least one occupant is utilizing the associated physical element and therefore occupying at least a portion of the first physical space during the first period of time (Block 902). In one embodiment, the portion of the plurality of probable utilization states is received over a second period of time which may be different from the first period of time.

For example, in one embodiment, the plurality of probable utilization states are received wirelessly, such via RF, infrared or other wireless medium, from sensors which are attached to the physical elements, such as to the underside of one or more chairs. In particular, the sensors of the present embodiment utilize a wireless point-to-point protocol whereby each sensor communicates with the receiver directly, whether it is an intermediary gateway device or data collection device, at a frequency of 418 MHz. Alternatively, other wireless protocols and frequencies, such as mesh networking protocols, cellular communications, WiMax or WiFi protocols, such as 802.11 protocols, may be used. It will further be appreciated that other communications media may be utilized, including wired communications links where appropriate, and that the selection of a communications medium is implementation dependent. The data may be reported in a packet-based format/protocol where the data values and other information are formatted using protocol-defined fields and values. Each sensor includes an accelerometer or other sensing device which measures and reports the magnitude of movement of the physical element at any given time, such as within a range of 0 to 255 or other suitable range. The sensor may collect several measurements over a period of time, such as 10 minutes at 15 second intervals, aggregate the measurements or otherwise summarize or combine them, such as by averaging the measurements, and then wirelessly report the aggregate/combined measurement. The reporting interval may feature a random variation to minimize collisions between the transmissions of different sensors. The aggregate/combined measurement may represent both the magnitude, based for example on the maximum or average magnitude sensed, and the duration, based for example on the number 15 second interval measurements, consecutive or not, over which movement was detected or where movement exceeded a defined threshold, of the sensed movement. It will be appreciated that there may be many methods of computing an aggregate or combined value based on the measured magnitude values, including averaging, minimum, maximum, or applying other mathematical and/or statistical operations to generate a value which accurately represents the utilization state of the physical element, e.g. whether or not the chair is actually occupied by a human being. Further, while measurement aggregation and periodic reporting may be utilized, such as to conserve available battery power of the sensor and/or avoid transmission collisions or other interference, continuous reporting may also be used particularly where battery power is not a concerned, e.g. self powered sensors, wired sensors, or sensor which may receive energy via wireless transmission means. In embodiments utilizing continuous reporting, raw magnitude measurements may be reported or the sensor may pre-process and report aggregate or combined measurements or otherwise suppress reporting of erroneous measurements, such as measurements which do not exceed a threshold value. Error detection and correction algorithms may be employed to ensure that reported data is received. In one embodiment utilizing sensors with transmission only capabilities, one or more previously reported, i.e. historical, data values may be redundantly reported/transmitted, such as with a timestamp to identify the associated prior reporting time, in concert with present data permitting the receiver to determine any data that was not previously received. Alternatively, the disclosed embodiments may be utilized with sensors having bidirectional communications capabilities, permitting the received to acknowledge or otherwise confirm receipt of transmitted data and the retransmission thereof in cases of receipt failure.

Referring back to FIG. 9, the method also includes evaluating at least a portion of the received portion of determined probable utilization states to determine a number of occupants occupying at least a portion of the physical space (Block 904). For example, the probable utilization state received over a particular period of time, such as a particular work shift, may be analyzed to determine occupancy during that particular period of time. In one embodiment, the evaluating further comprises determining whether an occupant is substantially likely to have caused the movement based on which the associated probable utilization state was determined. For example, the utilization states that are collected, e.g. the raw or aggregate/combined magnitude values, may be analyzed to determine whether they represent random movement of the physical element, such as someone accidentally brushing up against the physical element, wind, etc., or movement created by an actual occupant, such as someone actually sitting in the chair. This may be determined by, for example, comparing several sequential utilization states of the same physical element to determine if movement was detected only momentarily, repeatedly and/or continuously. Thresholds, normalization or other mathematical or statistical functions may be applied to eliminate false positives or negatives, or otherwise ensure the accuracy of the occupancy determination. In situations where it is determined that there are unreceived probable utilization states, the evaluating may further include determining the remaining probable utilization states which were not received based on the first plurality of time. For example, the evaluating may further comprise computing each of the unreceived probable utilization states by extrapolation and subsequently determine a number of occupants indicated thereby. Failures to receive probable utilization states may be caused by transmission interruptions or interference, sensor failures, tampering or the like and may be determined, for example, by comparing the data that is actually received against a known transmission schedule or otherwise expected results. For example, where it is known that there are 100 sensors each reporting a probable utilization state every 10 minutes, the received utilization states including a time-of-transmission, the receiver may determine when a given report is missing. In embodiments utilizing bidirectional communication, the missing data may be requested from the particular sensor, or where the sensor fails to receive acknowledgement of receipt, the sensor may attempt retransmission. Alternatively, in unidirectional communications based embodiments, the receiver may review reports of historical data to determine if the missing data was included therein.

The method further includes contextualizing the determined number of occupants to facilitate management of the occupancy of the first physical space (Block 906). In one embodiment, the contextualizing further includes determining occupancy of at least a portion of the first physical space at a specific time based on at least the received determined probable utilization states and demonstrating utilization of the portion of the first physical space at the specific time. Alternatively, or in addition thereto, the contextualizing further comprises determining occupancy of at least a portion of the first physical space at a plurality of specific times based on at least the received determined probable utilization states and demonstrating a change in occupancy of the portion of the first physical space over a period of time encompassing the plurality of specific times. The contextualizing may further include correlating occupancy of at least a portion of the first physical space to at least one event based on at least the received determined probable utilization states. Such events may include temporal events, such as time of day, day of week, month or year, holidays, and/or non-temporal events, such as business, economic or environmental events. The contextualizing may further include computing an index value, described above, representative of at least the received portion of the plurality of probable utilization states. The index value may provide a single simple representation of occupancy, such as over a particular period of time and/or for a particular space. In one embodiment, the index value may be computed as an average value of the probable utilization states. Alternatively, the index value may be derived based on other mathematical or statistical relationships. In yet another embodiment, the contextualizing includes correlating occupancy of at least a portion of the first physical space to at least one attribute thereof based on at least the received determined probable utilization states, wherein the attribute comprises at least one of location, environmental conditions, available amenities, décor, electrical consumption, or combinations thereof. Such correlation may allow, for example, determination of preferential attributes, e.g. space attributes which attracts employees to one space versus another space. Further, the contextualizing may include aggregating the received determined probable utilization states with previously received determined probable utilization states and contextualizing at least the received determined probable utilization states based on the aggregation, for example where the previously received determined probable utilization states were received for a second physical space different from the first physical space and/or where the previously received determined probable utilization states were received for a second physical space operated by an entity different than that which is associated with the first physical space.

Figure 8B:
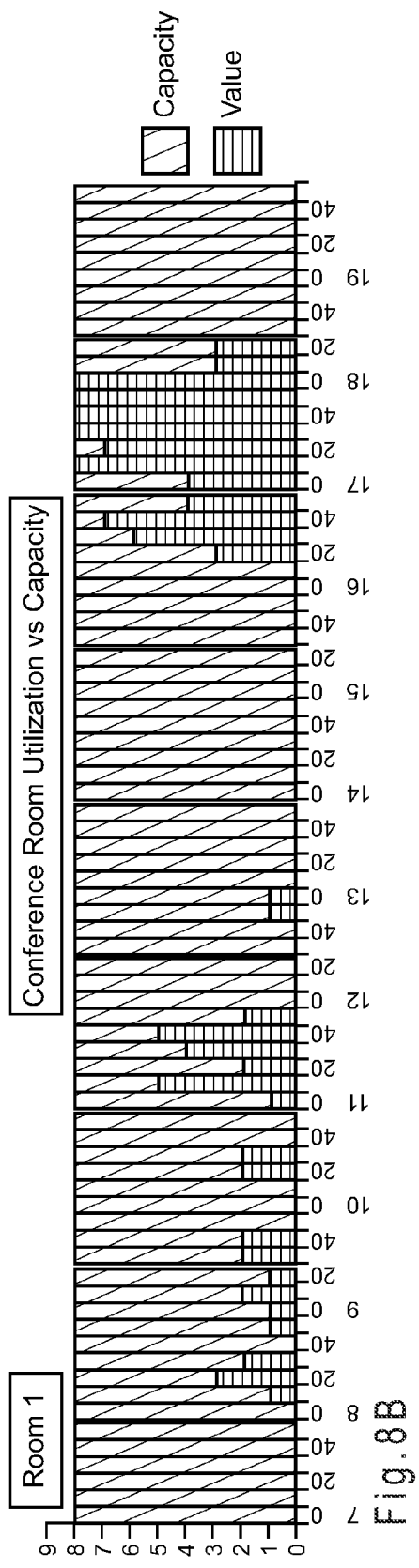
Figure 8C:
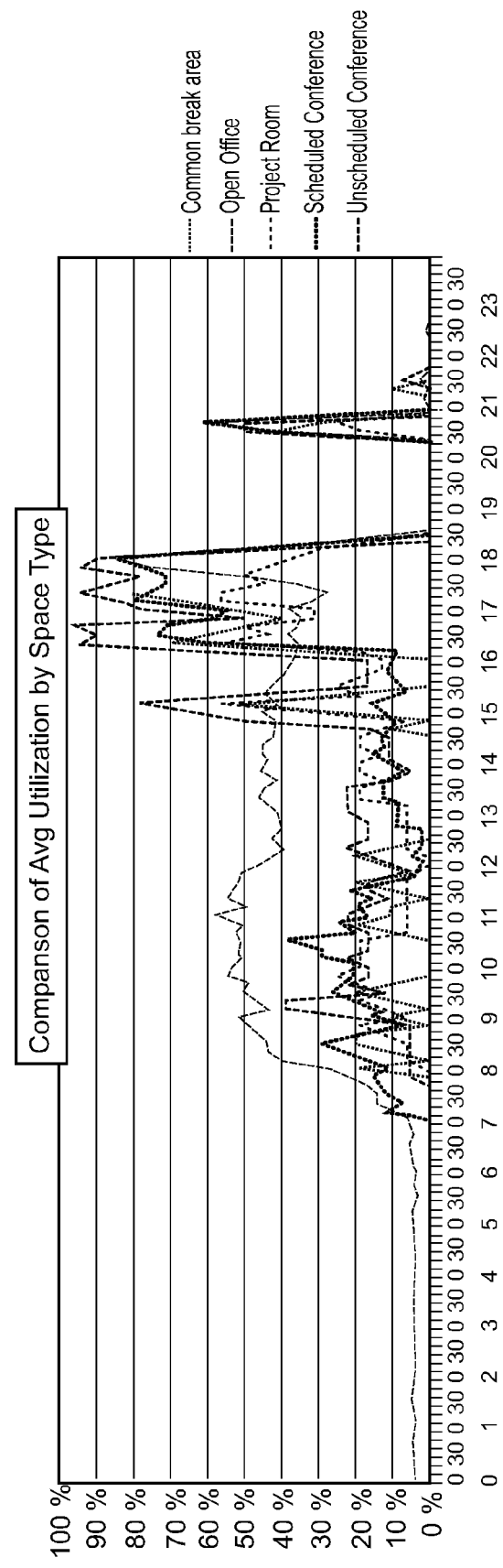
Figure 8D:
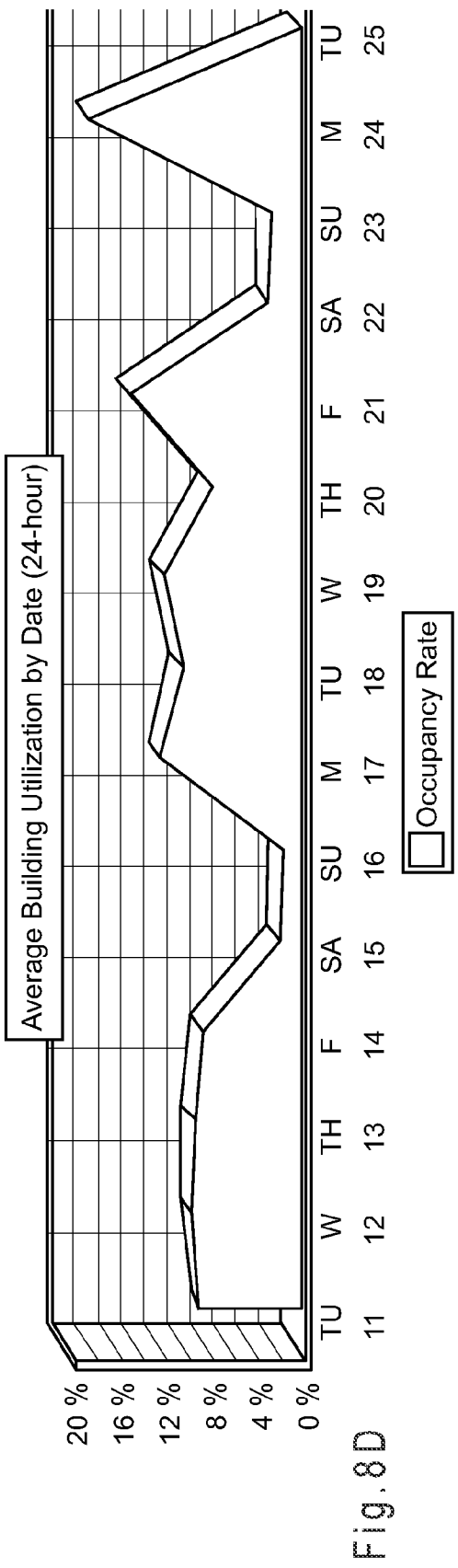
Figure 8E:
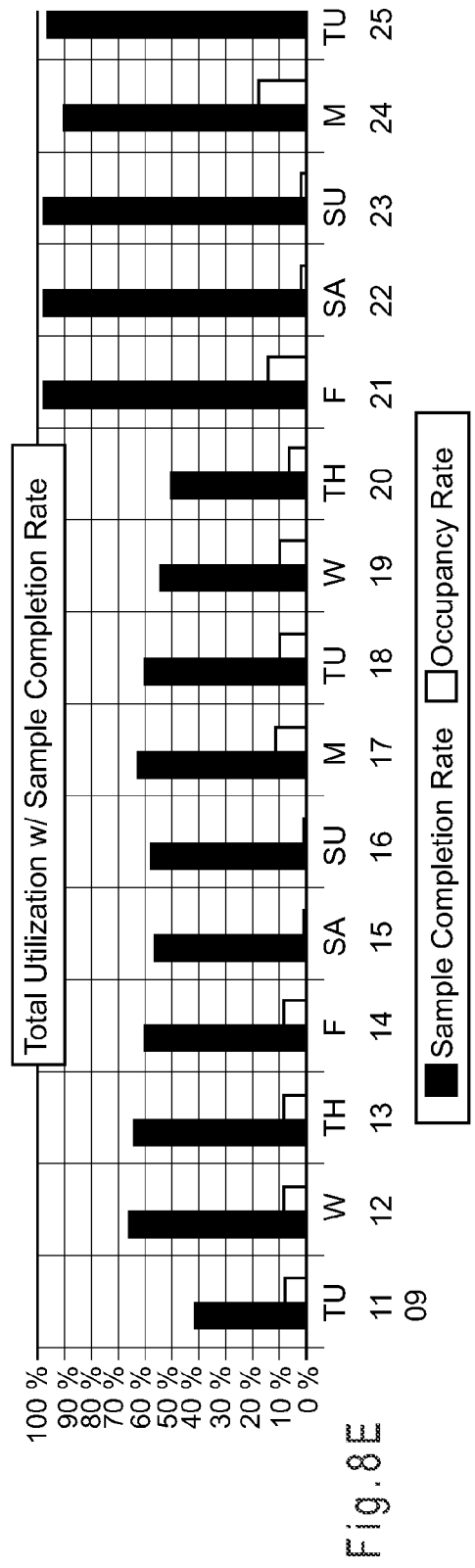
Figure 8F:
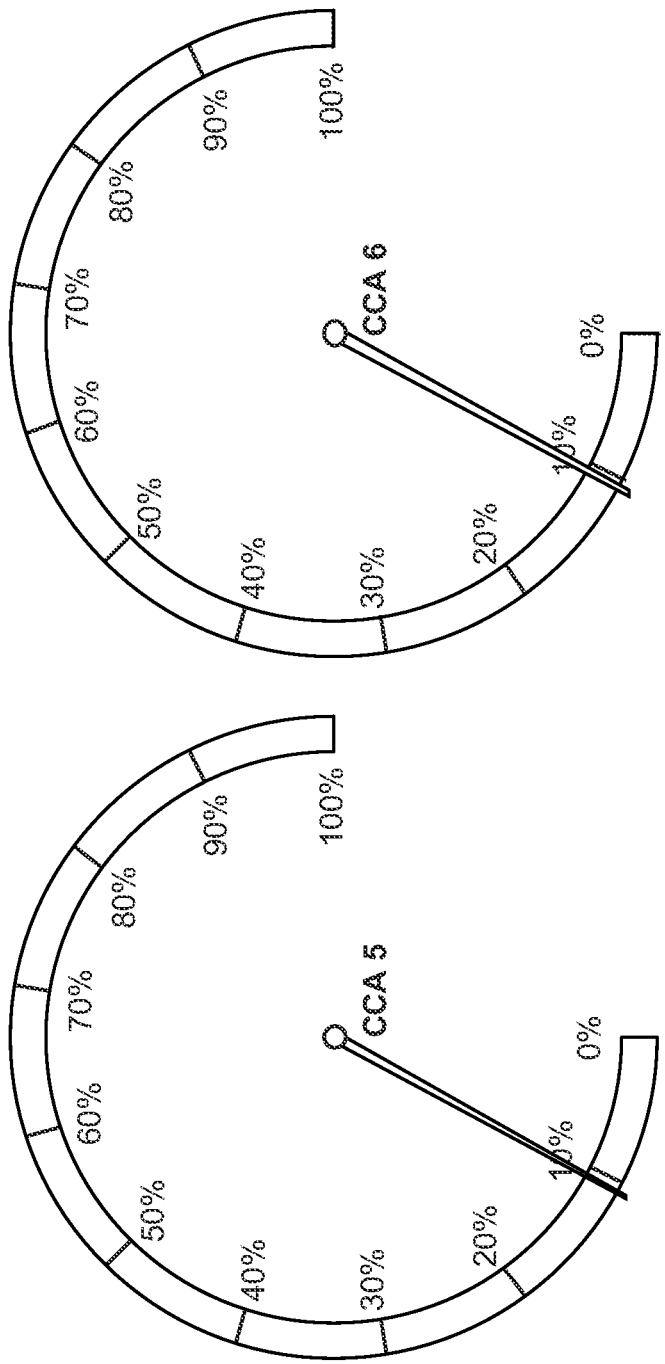
Figure 8G:
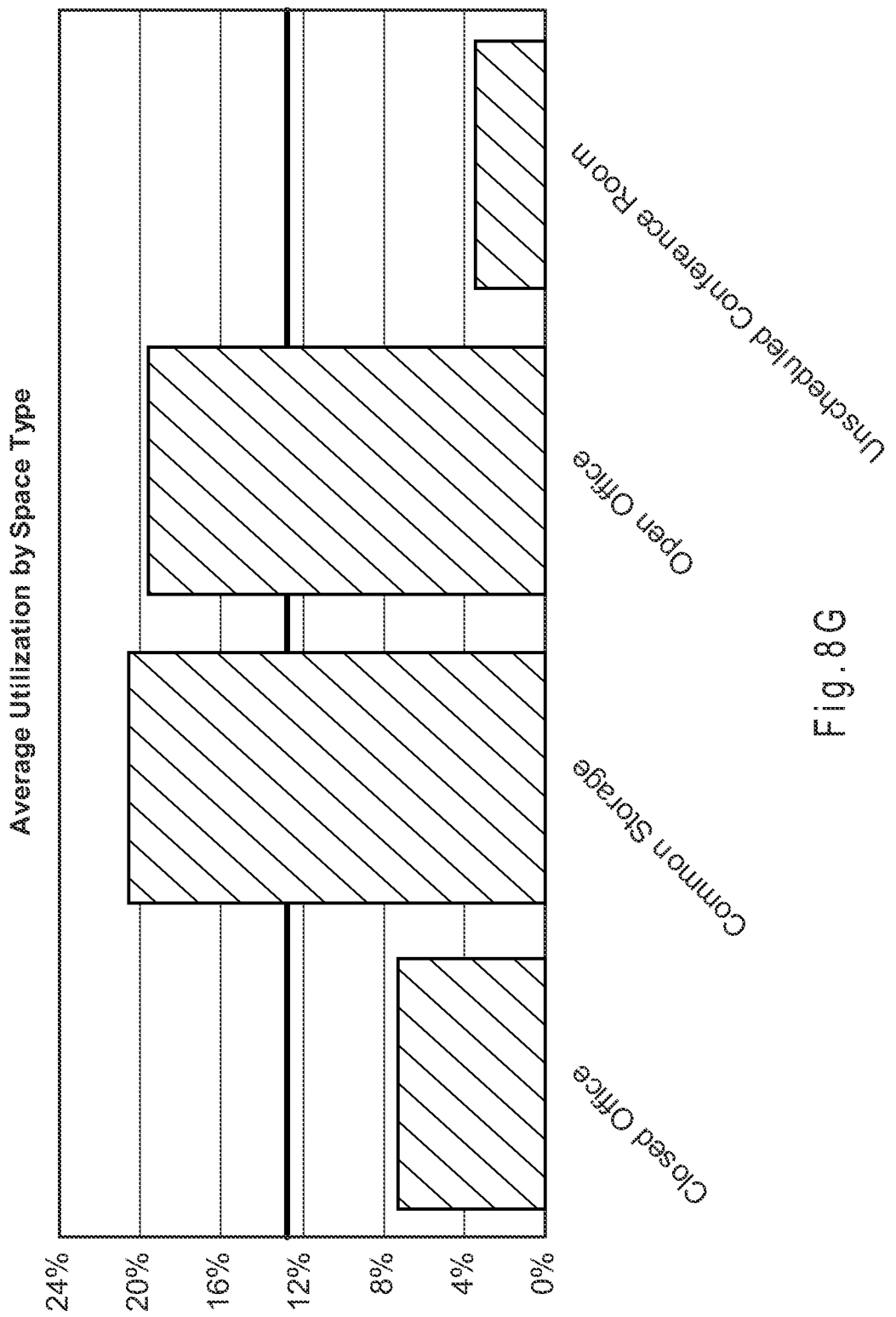
Figure 8H:
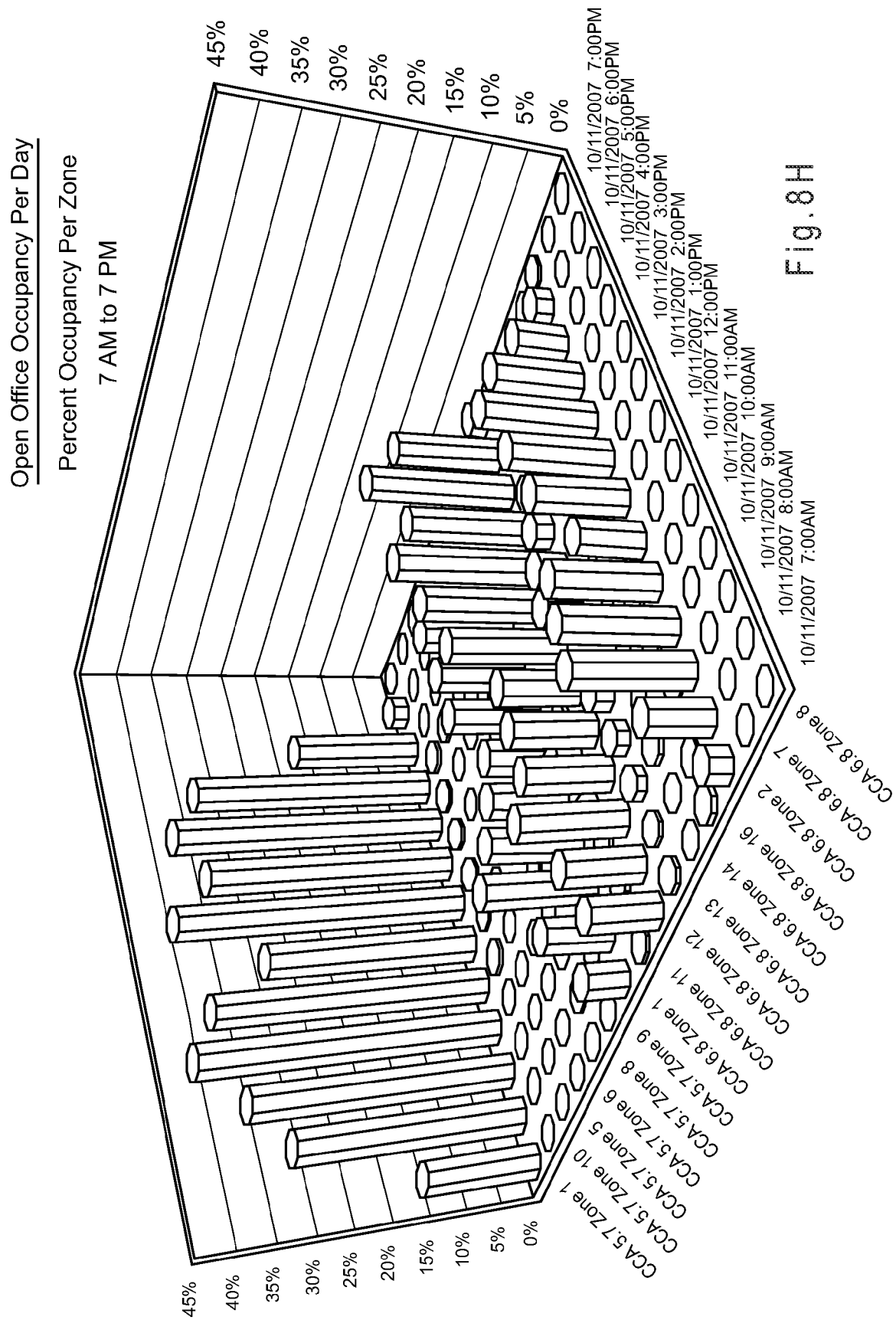
Figure 8I:
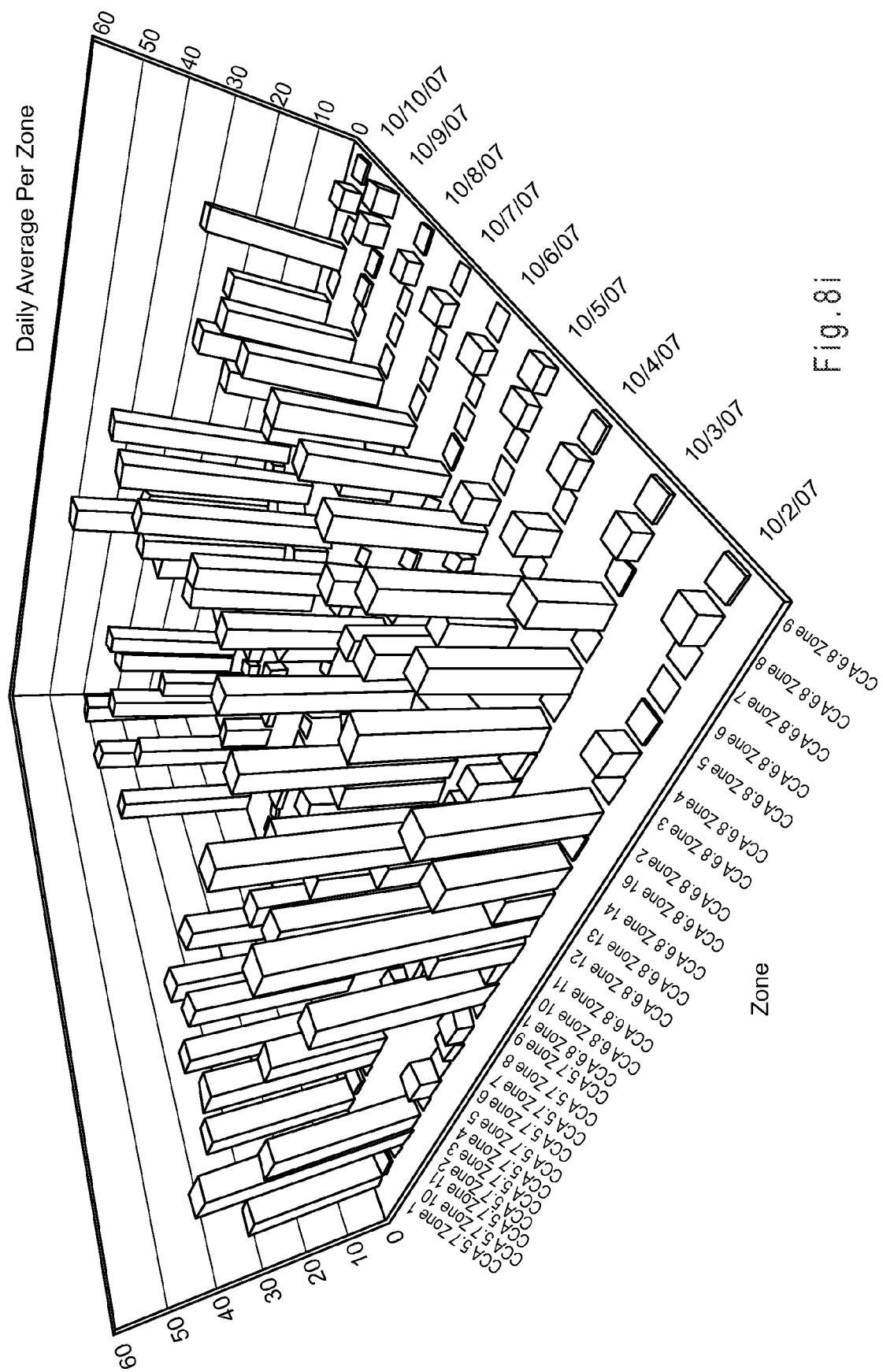
Figure 8J:
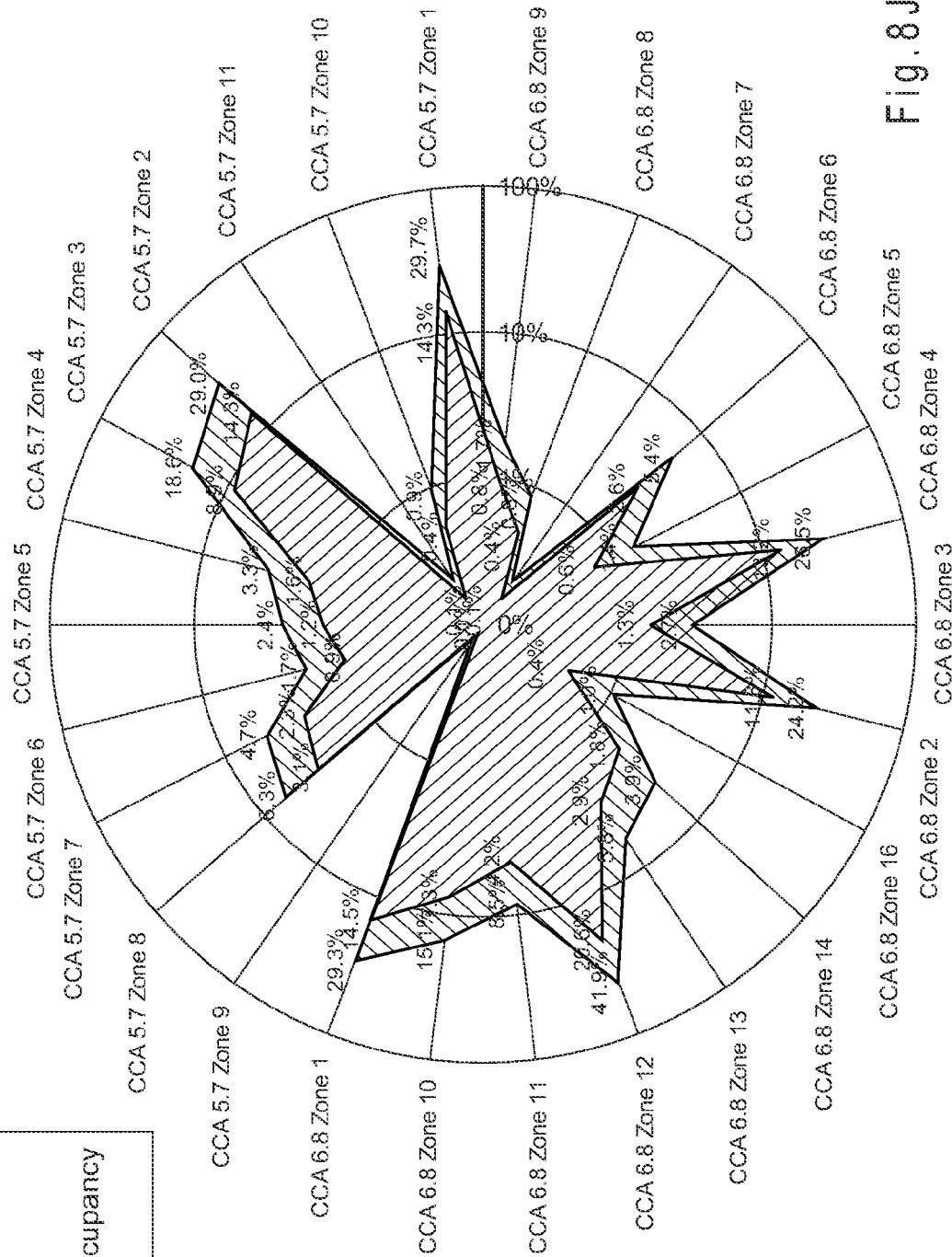
Figure 8K:
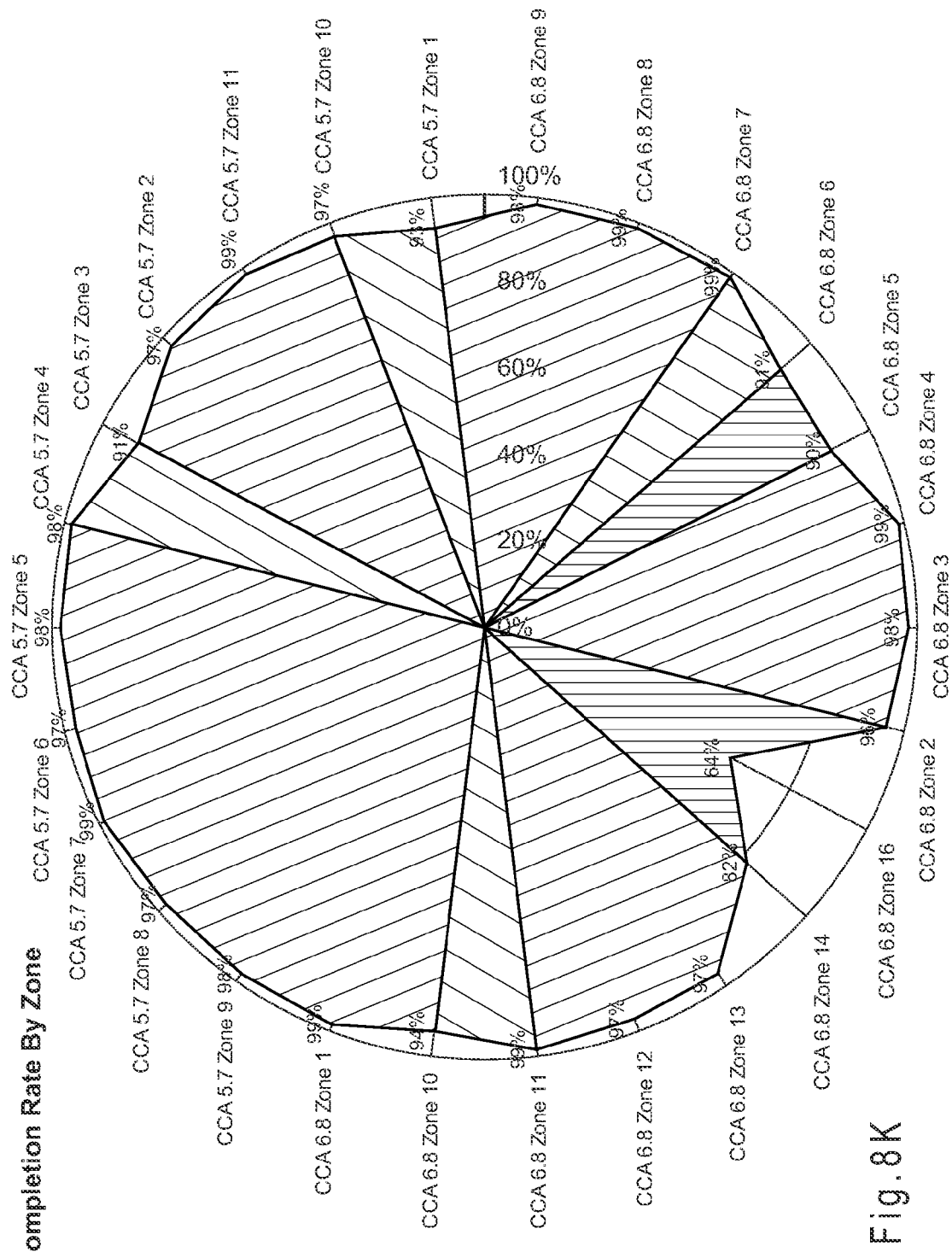
Figure 8M:
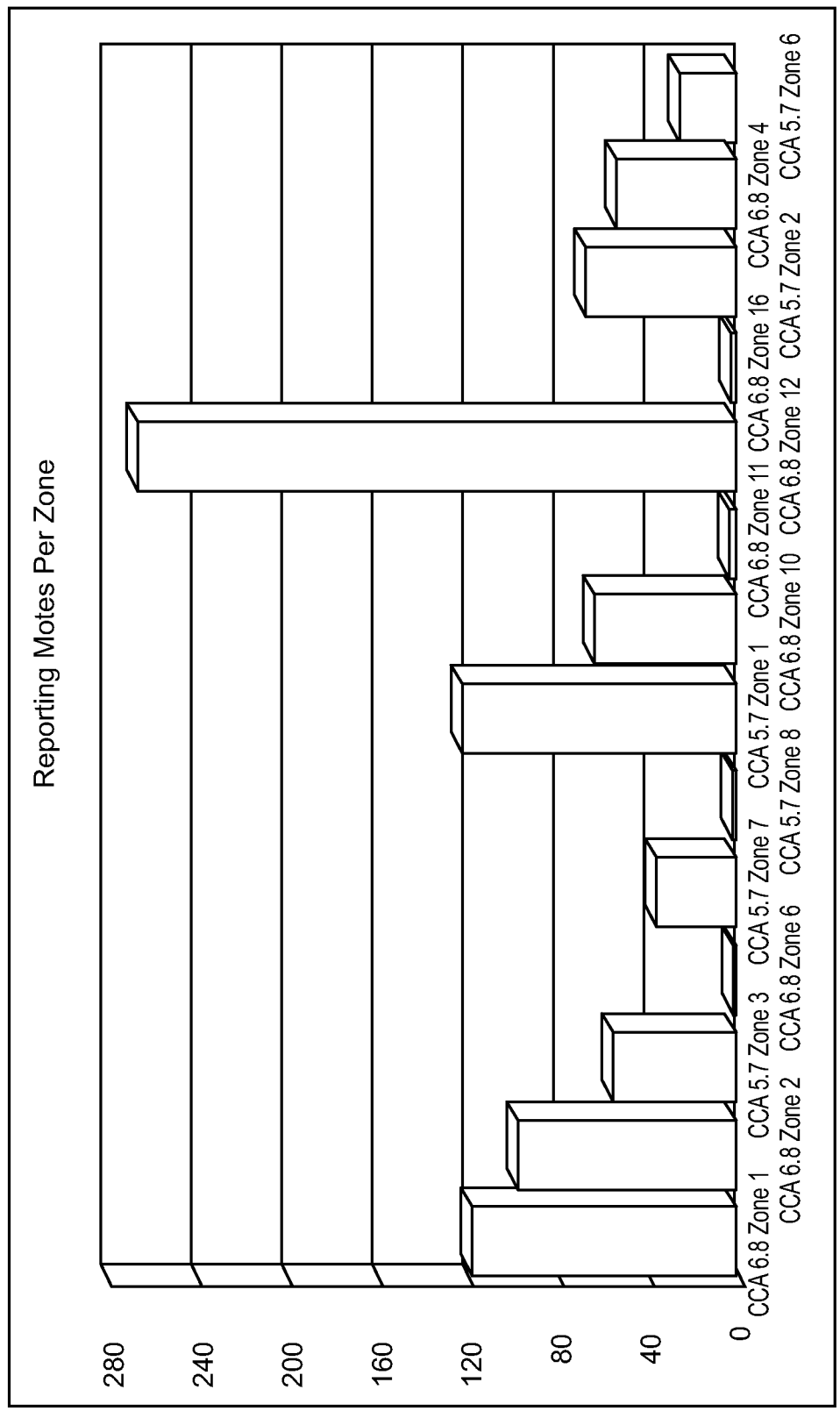
Figure 8N:
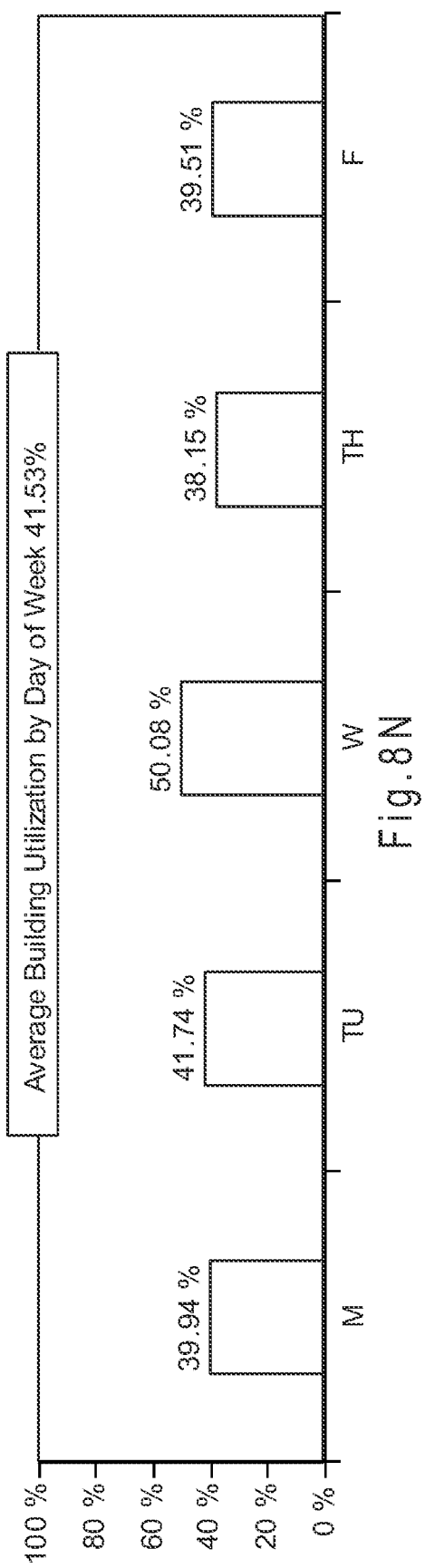
Figure 8O:
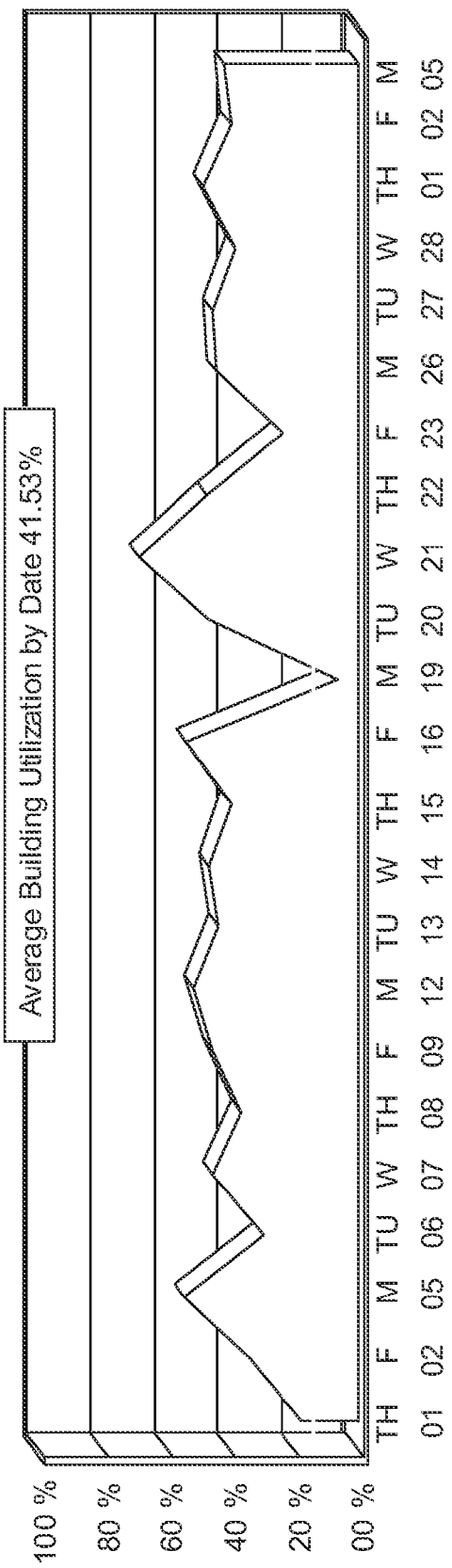
Figure 8P:
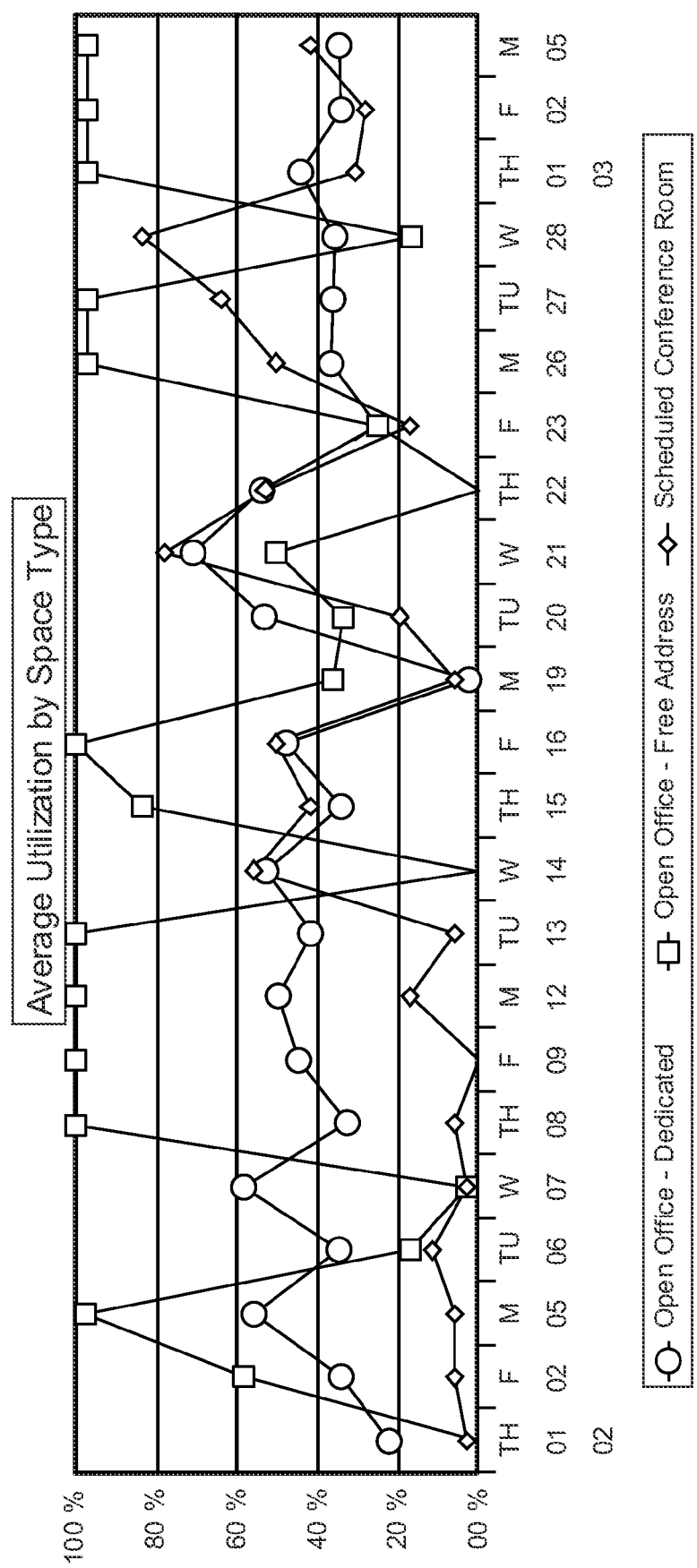
Figure 8Q:
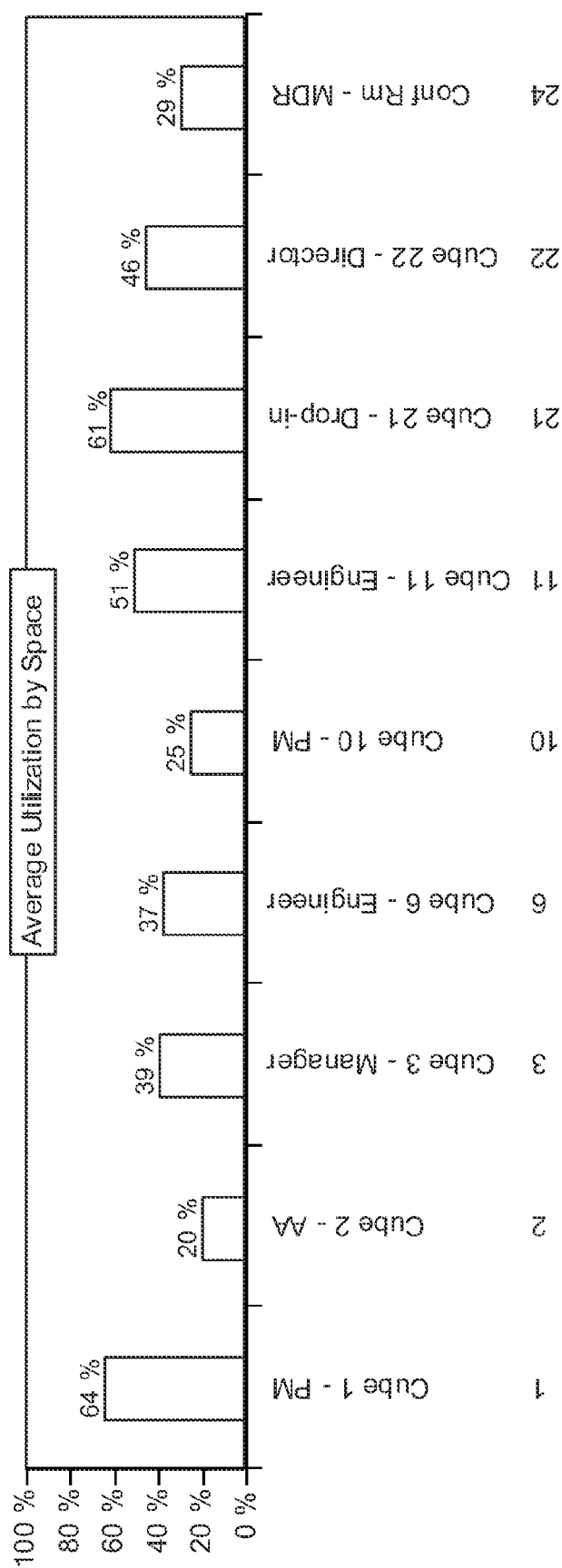
Figure 8R:
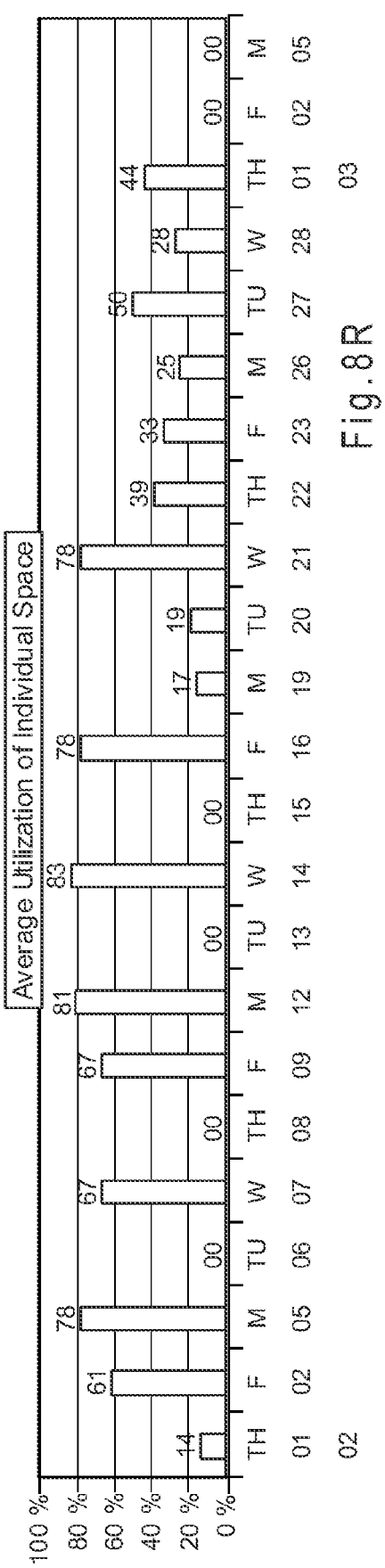
Figure 8S:
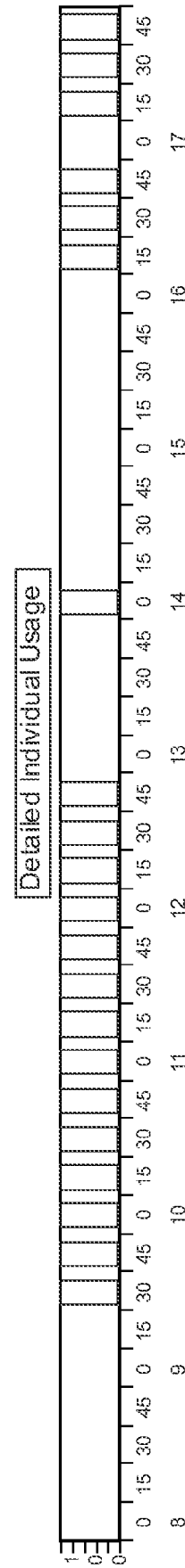
Figure 8T:
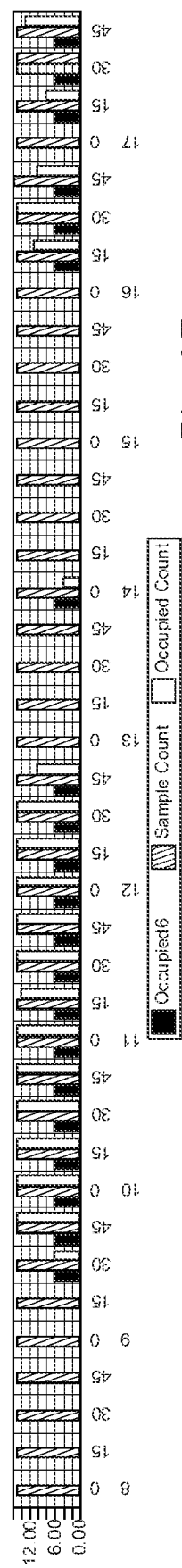
Figure 8U:
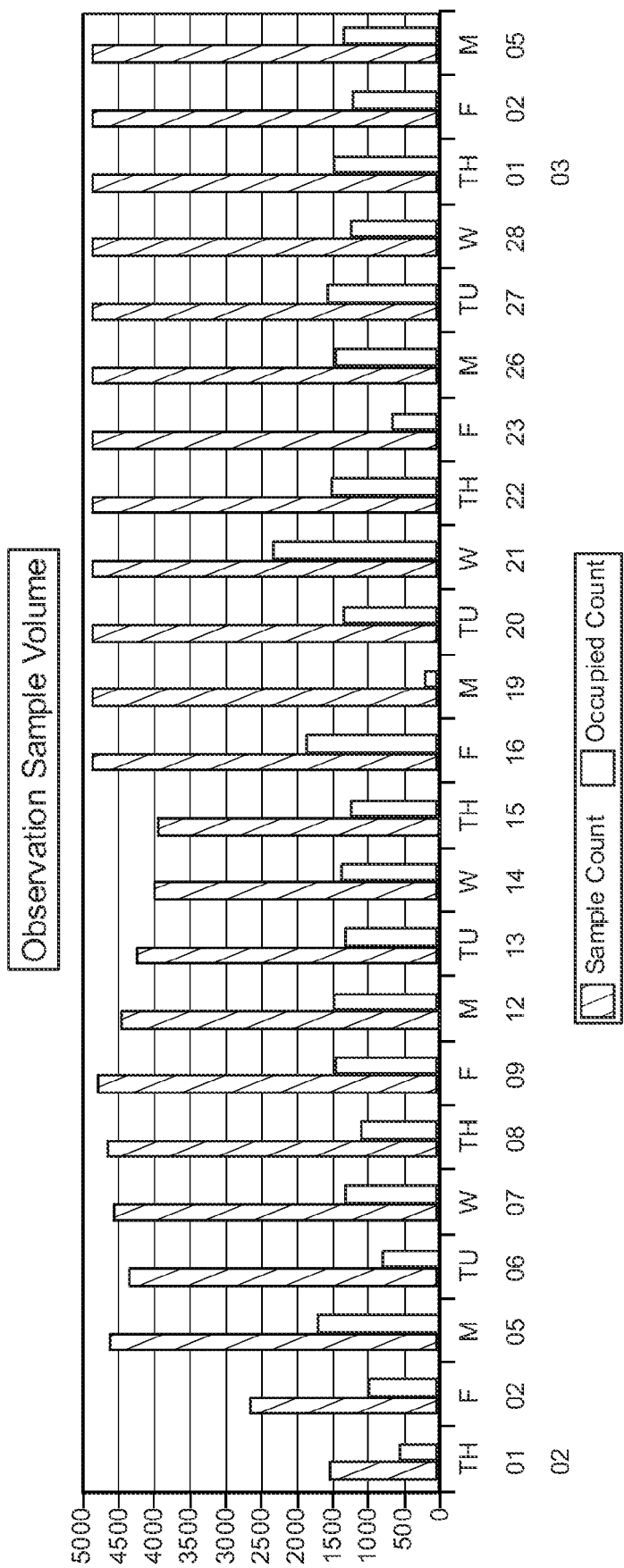

FIGS. 8B-8T show sample reports which may be generated using the disclosed embodiments. FIG. 8F shows a high-level dashboard view of the overall occupancy rate for a building. The two charts shown represent the two buildings that are part of a study. The data is based on a 12-hour day from 7 am to 7 pm M-F. FIG. 8G shows a high-level view that compares the total average utilization of each space type. Notice the trend line for overall average utilization. FIG. 8H shows a 3D chart which compares the average utilization of each "Open Office" zone on an hourly basis for a single day from 7 am to 7 pm. You can quickly see that 4-5 zones are much more heavily used than the others. One can also see a fairly uniform "camel-back" pattern for each zone representing the morning ramp-up, the lunch hour dip, and the evening ramp-down. FIG. 8I shows a 3D chart which compares the daily utilization of all zones. It may be possible to define a custom grid in which elevations could be mapped over a floor plan to provide a spatial view of occupancy rates. FIG. 8J shows a "radar" chart which provides a very easy way to see the utilization of all the zones defined for a study. You can quickly see that there are several zones that are very under utilized. The orange represents a calculation of the average utilization based on the number of samples received, where as the blue represents that same average based on the number of samples expected. FIG. 8K shows a diagnostic radar chart demonstrating the sample confidence. Green represents zones where 95% or more of the expected samples were received. Anything between 90%-95% is shown in yellow. Anything under 90% is shown in red. This allows you to quickly identify zones that may not have enough receiver coverage. It also allows you to confirm the completeness of the data set for each zone which ultimately translates into the sample confidency. FIG. 8L shows a chart representing sample completion rate by zone. FIG. 8M shows a diagnostic chart which demonstrates the volume of samples received from predefined groups of motes.

It will be appreciated that these charts are merely exemplary and that there may be other ways to contextualize occupancy data not shown.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superceding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

It is therefore intended that the foregoing detailed description be regarded as illustrative rather than limiting, and that it be understood that it is the following claims, including all equivalents, that are intended to define the spirit and scope of this invention.

APPENDIX A

The "Remove_dups" procedure in the database removes the duplicate records.

```
PROCEDURE REMOVE_DUPS
  IS
  V_last_rec_ts date;
  V_last_seq number :=0;
  V_last_serial_number
  app_occupancy.raw_point6.serial_number%type := '!';
  cursor packet_cur is
    select distinct serial_number,
                    sequence_number,
                    record_ts,
                    current_value,
                    hist1_value,
                    hist2_value,
                    hist3_value,
                    hist4_value,
                    listener_port
    from app_occupancy.raw_point6
    where packet_type_id in (5,4)
    order by serial_number, sequence_number, record_ts;
BEGIN -- Procedure
  For packet_rec in packet_cur
  Loop
    -- Check to see if we are starting on a new mote or sequence
  number or greater than 5 minutes.
    IF V_last_serial_number <> packet_rec.serial_number
       or V_last_seq <> packet_rec.sequence_number
       or packet_rec.record_ts-V_last_rec_ts >6/1440
    -- If so then set it to last output and write it.
    THEN
      V_last_serial_number := packet_rec.serial_number ;
      V_last_seq := packet_rec.sequence_number;
      V_last_rec_ts := packet_rec.record_ts;
      insert /*+ append nologging */ into
```

APPENDIX A-continued

The "Remove_dups" procedure in the database removes the duplicate records.

```
            app_occupancy.raw_point6_2 (serial_number,
                                        record_ts,
                                        sequence_number,
                                        current_value,
                                        hist1_value,
                                        hist2_value,
                                        hist3_value,
                                        hist4_value,
                                        listener_port)
        values(packet_rec.serial_number,
               packet_rec.record_ts,
               packet_rec.sequence_number,
               packet_rec.current_value,
               packet_rec.hist1_value,
               packet_rec.hist2_value,
               packet_rec.hist3_value,
               packet_rec.hist4_value,
               packet_rec.listener_port);
        END IF;
    End Loop;
    commit;
END; -- Procedure
```

APPENDIX B

Populate Observation

```
define study_no = &1
-- ************************************************************
-- * Delete all rows for a given study in preparation for new load *
-- ************************************************************
truncate table app_occupancy.work_obs;
truncate table app_occupancy.raw_point6_2;
exec app_occupancy.remove_dups
select count(*) from raw_point6_2;
-- ***********************
-- * Repopulate the study *
-- ***********************
insert /*+ append nologging */ into app_occupancy.work_obs
select
        all_possible_obs.device_id,
        all_possible_obs.study_id,
        all_possible_obs.observation_ts,
        all_possible_obs.space_id,
        recorded_obs.value,
        'Occupancy',
        nvl(recorded_obs.sample_cnt,0),
        recorded_obs.raw_data
    from
    (select /*intentional cartesean join */ observation_ts, y.serial_number,
x.space_id,z.study_id, y.device_id
        from app_occupancy.time t,
             app_occupancy.study z,
             app_occupancy.device y,
             app_occupancy.deployment x
        where x.device_id = y.device_id
              and x.study_id = &&study_no
              and z.study_id = &&study_no
              and t.observation_ts between x.start_date and x.end_date
              and t.observation_ts between z.start_date and z.end_date)
all_possible_obs,
--*************************************
--* Prepare raw data for outer join *
--*************************************
    (select distinct
        serial_number,
        -- Round time to the 10 minute interval
        trunc((rp6.record_ts−5/1440),'HH')+(trunc(((rp6.record_ts−5/
1440)− trunc((rp6.record_ts−5/1440),'HH'))*24/
        (10/60))+1)/(60/10)/24 + study.gmt_offset/24 observation_ts,
        case when rp6.current_value >70 then 1 else 0 end value,
-- convert mote value to occupancy
        1 sample_cnt,
        current_value raw_data
```

APPENDIX B-continued

Populate Observation

```
    from
        app_occupancy.raw_point6_2 rp6,
        app_occupancy.study
    where
--      rp6.packet_type_id in (5,4) and
        study.study_id = &&study_no) recorded_obs
--*********************************************
-- Outer join the two virtual views above *
--*********************************************
    where all_possible_obs.serial_number =
          recorded_obs.serial_number(+) and
          all_possible_obs.observation_ts =
          recorded_obs.observation_ts(+);
commit;
delete from app_occupancy.observation where study_id = &&study_no;
Insert into app_occupancy.observation(device_id, study_id,
observation_ts,space_id,value,metric_name, sample_cnt, raw_data)
    select device_id, study_id,
observation_ts,space_id,max(value),'OCCUPANCY',max(sample_cnt),
max(raw_data)
        from work_obs
        group by device_id, study_id, observation_ts,space_id;
commit;
exit;
```

We claim:

1. A method of facilitating management of occupancy of a first physical space, the first physical space comprising a plurality of physical elements, wherein each of the physical elements is attached to one or more sensors, the method comprising:

generating data by monitoring at least one of the plurality of physical elements over a first period of time by at least one of the one or more sensors;

determining, based on the generated data, a portion of probable utilization states by the at least one of the one or more sensors;

transmitting the portion of probable utilization states of the first physical space from the at least one of the one or more sensors to an evaluation processor;

determining, by the evaluation processor, that an additional portion of probable utilization states were not received based on a reporting interval of the at least one of the one or more sensors;

determining, by the evaluation processor, the additional portion of probable utilization states by extrapolation;

determining, by the evaluation processor, a plurality of probable utilization states of the first physical space over the first period of time based on the received portion of probable utilization states and the determined additional portion;

determining, by the evaluation processor, a number of occupants occupying at least a portion of the first physical space by evaluating at least a portion of the determined probable utilization states and determining whether movement of the at least one of the plurality of physical elements was caused by an occupant or was due to some other cause by combining sensor data with additional occupancy data inputs or by comparing a plurality of sequential utilization states of the determined probable utilization states for the at least one of the plurality of physical elements;

contextualizing, by a contextualization processor, the determined number of occupants of the first physical space by correlating the determined number of occupants to at least one of: an attribute of the first physical space, a temporal event, or a non-temporal event; and generating and displaying a report from the contextualized determined number of occupants.

2. The method of claim 1 wherein at least one of the plurality of physical elements comprises a seat, wherein a probable utilization state of the seat is indicative of whether an occupant is occupying the seat.

3. The method of claim 1 wherein at least one of the plurality of physical elements comprises a work surface, wherein a probable utilization state of the work surface is indicative of whether an occupant is working at the work surface.

4. The method of claim 1 wherein the contextualizing further comprises correlating occupancy of at least a portion of the first physical space to at least one event based on the determined probable utilization states.

5. The method of claim 1 wherein the contextualizing further comprises correlating occupancy of at least a portion of the first physical space to at least one attribute thereof based on the determined probable utilization states.

6. The method of claim 5 wherein the attribute comprises at least one of location, environmental conditions, available amenities, decor, electrical consumption, or combinations thereof.

7. The method of claim 1 wherein the contextualizing further comprises aggregating the determined probable utilization states with previously determined probable utilization states and contextualizing the determined probable utilization states based on the aggregation.

8. The method of claim 7 wherein the previously determined probable utilization states were received for a second physical space different from the first physical space.

9. The method of claim 7 wherein the previously determined probable utilization states were received for a second physical space operated by an entity different than that which is associated with the first physical space.

10. The method of claim 1, wherein at least one of the plurality of physical elements comprises a chair, wherein at least one of the one or more sensors comprises an accelerometer attached to the chair and configured to determine a change in velocity of the chair as a function of time.

11. The method of claim 1, wherein the step of generating data by monitoring at least one of the plurality of physical elements comprises:
    measuring a magnitude of movement of a physical element of the plurality of physical elements within the physical space by a sensor of the one or more sensors that is physically attached to the physical element; and
    determining a probable utilization state for the physical element based on a plurality of magnitude values representative of the measured magnitude of movement of the physical element.

12. The method of claim 11 further comprising measuring a direction of movement of the physical element by the sensor physically attached to the physical element, and wherein determining the portion of the probable utilization states comprises determining a probable utilization state based on the plurality of magnitude values and a plurality of direction of movement values representative of the measured direction of movement of the physical element.

13. A system for facilitating management of occupancy of a first physical space, the first physical space comprising a plurality of physical elements, the system comprising:
    one or more sensors attached to each of the physical elements;
    each of the one or more sensors comprising:
        a sensor processor;
        a sensor memory connected to said sensor processor;
        cause the sensor processor to perform the steps of:
            generating data by monitoring at least one of the plurality of physical elements over a first period of time; and
            determining, based on the generated data, a portion of probable utilization states;
    and a server comprising:
        a processor;
        a memory connected to said processor;
        the memory storing instructions that, when executed, cause the processor to perform the steps of:
            receiving the portion of portable utilization states of the first physical space from the at least one of the one or more sensors;
            determining that an additional portion of probable utilization states were not received based on a reporting interval of at least one of the one or more sensors;
            determining the additional portion of probable utilization states by extrapolation;
            determining a plurality of probable utilization states of the first physical space over the first period of time based on the received portion of probable utilization states and the determined additional portion;
            determining a number of occupants occupying at least a portion of the first physical space by evaluating at least a portion of the determined probable utilization states and determining whether movement of the at least one of the plurality of physical elements was caused by an occupant or was due to some other cause by combining sensor data with additional occupancy data inputs or by comparing a plurality of sequential utilization states of the determined probable utilization states for the at least one of the plurality of physical elements;
            contextualizing the determined number of occupants of the first physical space by correlating the determined number of occupants to at least one of: an attribute of the first physical space, a temporal event, or a non-temporal event; and
            generating and displaying a report from the contextualized determined number of occupants.

14. The system of claim 13 wherein at least one of the plurality of physical elements comprises a seat, wherein a probable utilization state of the seat is indicative of whether an occupant is occupying the seat.

15. The system of claim 13 wherein at least one of the plurality of physical elements comprises a work surface, wherein a probable utilization state of the work surface is indicative of whether an occupant is working at the work surface.

16. The system of claim 13 wherein the memory of the server stores instructions that, when executed, cause the processor to correlate occupancy of at least a portion of the first physical space to at least one event based on the determined probable utilization states.

17. The system of claim 13 wherein the memory of the server stores instructions that, when executed, cause the processor to correlate occupancy of at least a portion of the first physical space to at least one attribute thereof based on the determined probable utilization states.

18. The system of claim 17 wherein the attribute comprises at least one of location, environmental conditions, available amenities, decor, electrical consumption, or combinations thereof.

19. The system of claim 13 wherein the memory of the server stores instructions that, when executed, cause the processor to aggregate the determined probable utilization states with previously determined probable utilization states and contextualize the determined probable utilization states based on the aggregation.

20. The system of claim 19 wherein the previously determined probable utilization states were received for a second physical space different from the first physical space.

21. The system of claim 19 wherein the previously determined probable utilization states were received for a second physical space operated by an entity different than that which is associated with the first physical space.

22. The system of claim 13, wherein at least one of the plurality of physical elements comprises a chair, wherein at least one of the one or more sensors comprises an accelerometer attached to the chair and configured to determine a change in velocity of the chair as a function of time.

23. The system of claim 13, wherein the sensor memory stores instructions that, when executed, cause the sensor processor to measure a magnitude of movement of a physical element of the plurality of physical elements within the physical space, and wherein the sensor memory stores instructions that, when executed, cause the sensor processor to determine a probable utilization state for the physical element based on a plurality of magnitude values representative of the measured magnitude of movement of the physical element.

24. The system of claim 23 wherein the sensor memory stores instructions that, when executed, cause the sensor processor to measure a direction of movement of the physical element, and wherein the sensor memory stores instructions that, when executed, cause the sensor processor to determine a probable utilization state based on the plurality of magnitude values and a plurality of direction of movement values representative of the measured direction of movement of the physical element.

* * * * *

UNITED STATES PATENT AND TRADEMARK OFFICE
CERTIFICATE OF CORRECTION

PATENT NO. : 8,577,711 B2  
APPLICATION NO. : 12/011370  
DATED : November 5, 2013  
INVENTOR(S) : Steven A. Korecki et al.

Page 1 of 1

It is certified that error appears in the above-identified patent and that said Letters Patent is hereby corrected as shown below:

In the Claims

In column 34, claim 13, line 4, before "cause the sensor processor" insert --the sensor memory storing instructions that, when executed,--.

Signed and Sealed this
Tenth Day of June, 2014

Michelle K. Lee
*Deputy Director of the United States Patent and Trademark Office*